(12) United States Patent
Aihara et al.

(10) Patent No.: US 11,798,574 B2
(45) Date of Patent: Oct. 24, 2023

(54) VOICE SEPARATION DEVICE, VOICE SEPARATION METHOD, VOICE SEPARATION PROGRAM, AND VOICE SEPARATION SYSTEM

(71) Applicants: MITSUBISHI ELECTRIC CORPORATION, Tokyo (JP); MITSUBISHI ELECTRIC RESEARCH LABORATORIES, INC., Cambridge, MA (US)

(72) Inventors: Ryo Aihara, Tokyo (JP); Toshiyuki Hanazawa, Tokyo (JP); Yohei Okato, Tokyo (JP); Gordon P Wichern, Cambridge, MA (US); Jonathan Le Roux, Cambridge, MA (US)

(73) Assignees: MITSUBISHI ELECTRIC CORPORATION, Tokyo (JP); MITSUBISHI ELECTRIC RESEARCH LABORATORIES, INC., Cambridge, MA (US)

( * ) Notice: Subject to any disclaimer, the term of this patent is extended or adjusted under 35 U.S.C. 154(b) by 514 days.

(21) Appl. No.: 17/146,834

(22) Filed: Jan. 12, 2021

(65) Prior Publication Data
US 2021/0233550 A1 Jul. 29, 2021

Related U.S. Application Data

(63) Continuation of application No. PCT/JP2018/031294, filed on Aug. 24, 2018.

(51) Int. Cl.
*G10L 21/028* (2013.01)
*G06N 3/08* (2023.01)
(Continued)

(52) U.S. Cl.
CPC .............. *G10L 21/028* (2013.01); *G06N 3/08* (2013.01); *G10L 15/02* (2013.01); *G10L 15/063* (2013.01); *G10L 15/16* (2013.01); *G10L 15/22* (2013.01)

(58) Field of Classification Search
CPC ... G10L 21/028; G10L 21/0272; G10L 15/02; G10L 15/063; G10L 15/16; G10L 15/22;
(Continued)

(56) References Cited

U.S. PATENT DOCUMENTS

2016/0189730 A1* 6/2016 Du ..................... G10L 21/0272
704/233
2017/0011741 A1* 1/2017 Hershey ................ G10L 15/063
(Continued)

OTHER PUBLICATIONS

Wang et al. "Alternative Objective Functions for Deep Clustering", IEEE, 2018 https://ieeexplore.ieee.org/abstract/document/8462507 https://ieeexplore.ieee.org/stamp/stamp.jsp?tp=&arnumber=8462507 (Year: 2018).*
(Continued)

*Primary Examiner* — Yogeshkumar Patel
(74) *Attorney, Agent, or Firm* — Birch, Stewart, Kolasch & Birch, LLP

(57) ABSTRACT

A speech separation device (12) of a speech separation system includes a feature amount extraction unit (121) configured to extract time-series data of a speech feature amount of mixed speech, a block division unit (122) configured to divide the time-series data of the speech feature amount into blocks having a certain time width, a speech separation neural network (1b) configured to create time-series data of a mask of each of a plurality of speakers from the time-series data of the speech feature amount divided into blocks, and a speech restoration unit (123) configured to restore the speech data of each of the plurality of speakers
(Continued)

from the time-series data of the mask and the time-series data of the speech feature amount of the mixed speech.

20 Claims, 13 Drawing Sheets

(51) Int. Cl.
  *G10L 15/02* (2006.01)
  *G10L 15/06* (2013.01)
  *G10L 15/16* (2006.01)
  *G10L 15/22* (2006.01)
(58) Field of Classification Search
  CPC ......... G10L 25/30; G10L 15/07; G10L 15/20; G10L 2021/02087; G06N 3/08
  See application file for complete search history.

(56) References Cited

U.S. PATENT DOCUMENTS

| | | | |
|---|---|---|---|
| 2017/0178666 A1* | 6/2017 | Yu | ........................... G10L 25/30 |
| 2017/0178686 A1 | 6/2017 | Yu | |
| 2017/0337924 A1 | 11/2017 | Yu | |

OTHER PUBLICATIONS

German Office Action for German Application No. 11 2018 007 846.9, dated Oct. 15, 2021, with an English translation.
Wang et al., "Alternative Objective Functions for Deep Clustering", Proc. IEEE International Conference on Acoustics, Speech and Signal Processing (ICASSP), 2018, pp. 1-7.
Indian Office Action dated Jan. 10, 2022 issued in counterpart Indian Application No. 202147003035 with an English Translation.

* cited by examiner

VOICE SEPARATION DEVICE, VOICE SEPARATION METHOD, VOICE SEPARATION PROGRAM, AND VOICE SEPARATION SYSTEM

CROSS REFERENCE TO RELATED APPLICATIONS

This application is a Continuation of PCT International Application No. PCT/JP2018/031294, filed on Aug. 24, 2018, which is hereby expressly incorporated by reference into the present application.

TECHNICAL FIELD

The present invention relates to a speech separation device, a speech separation method, a speech separation program, and a speech separation system including the speech separation device, for separating, from mixed speech data of mixed speech including speech of a plurality of speakers, speech data of speech of each of the plurality of speakers.

BACKGROUND ART

In general, speech recognition processing is performed on speech uttered by one speaker. When speech recognition processing is performed on mixed speech including a plurality of pieces of speech uttered by a plurality of speakers at the same time, the accuracy of the speech recognition decreases significantly. Therefore, it is required to separate the mixed speech of the plurality of speakers into the speech of any one of the plurality of speakers (hereinafter also referred to as "each speaker" or "original speaker"), that is, to separate the mixed speech data into the speech data of each speaker.

In Non-Patent Literature 1, there is proposed a speech separation method of separating the mixed speech of a plurality of speakers. In this method, a Bidirectional Long Short-Term Memory (BLSTM) is used to estimate a mask of each speaker and an embedded vector enabling speakers to be separated by unsupervised clustering from a power spectrum of the mixed speech of the plurality of speakers. Through application of the estimated mask of each speaker to the mixed speech of the plurality of speakers, the speech of each speaker is separated from the mixed speech. A neural network built from a BLSTM is referred to as "BLSTM neural network."

The mask is a filter into which the speech feature amount of the mixed speech of the plurality of speakers is input to output the speech feature amount of the speech of each speaker. Masks can be roughly classified into two types, namely, soft masks and binary masks. A soft mask can indicate, for each frequency-time bin, in terms of a ratio, a component of the speech feature amount of the speech of each speaker included in the speech feature amount of the mixed speech of the plurality of speakers. A binary mask can indicate the dominant speaker for each frequency-time bin in binary representation.

The time-frequency bin is a scalar value or vector representing speech information analyzed for a given time width and a given frequency width. For example, a time-frequency bin is a complex value representing a power and a phase for a range obtained by dividing speech recorded at a sampling frequency of 8 kHz into 8 ms intervals with a window width of 32 ms in the time direction and uniformly dividing frequencies of from 0 Hz to 4 kHz into 1,024 intervals in the frequency direction.

The embedded vector is a vector estimated for each time-frequency bin of the speech feature amount. Through learning of a BLSTM neural network, the embedded vectors of the same speaker become more similar to each other, and the embedded vectors of different speakers become less similar to each other. Learning the BLSTM neural network in this way enables the speech of each speaker to be separated from the mixed speech of a plurality of speakers each time the estimated embedded vectors are clustered.

CITATION LIST

Non Patent Literature

[NPL 1] Z.-Q. Wang and two others, "Alternative Objective Functions for Deep Clustering," IEEE International Conference on Acoustics, Speech, and Signal Processing (ICASSP), 2018

SUMMARY OF INVENTION

Technical Problem

However, a speech separation method using a BLSTM neural network uses a combination of a speech signal from the past recurring in the future and a speech signal from the future recurring in the past. Therefore, in a speech separation method using a BLSTM neural network, it is not possible to separate and output the speech of each speaker only after all speech signals have been input. That is, there is a problem in that a processing delay equal to or more than the time corresponding to the speech length of the input speech signal occurs.

In place of the BLSTM, a Long Short-Term Memory (LSTM) using only the speech signals from the past that recur in the future can be used, but there is a problem in that the speech separation accuracy of the speech of each speaker decreases. A neural network composed of an LSTM is referred to as "LSTM neural network."

The present invention has been made in order to solve the problems described above, and it is an object of the present invention to provide a speech separation device, a speech separation method, a speech separation program, and a speech separation system which are capable of lowering a reduction in speech separation accuracy while reducing a processing delay in speech separation.

Solution to Problem

According to one aspect of the present invention, there is provided a speech separation device configured to separate, from mixed speech data of mixed speech including speech of a plurality of speakers, speech data of speech of each of the plurality of speakers, the speech separation device including: a feature amount extraction unit configured to extract time-series data of a speech feature amount of the mixed speech from the mixed speech data; a block division unit configured to divide the time-series data of the speech feature amount into blocks having a certain time width to generate time-series data of the speech feature amount divided into blocks; a speech separation neural network including a combination of an LSTM neural network forward in a time axis direction and an LSTM neural network backward in the time axis direction, the speech separation neural network being configured to create time-series data of a mask of each of the plurality of speakers from the time-series data of the speech feature amount divided into blocks; and a speech restoration unit configured to restore the speech data of the speech of each of the plurality of speakers from the time-series data of the mask and the time-series data of the speech feature amount of the mixed speech, the speech separation neural network being configured to use, when creating the time-series data of the mask of each of the plurality of speakers, the time-series data of a block earlier in time than a present time in the forward LSTM neural network, and the time-series data of a block composed of a predetermined number of frames later in time than the present time in the backward LSTM neural network.

According to another aspect of the present invention, there is provided a speech separation system including: the above-mentioned speech separation device; and a speech separation model learning device configured to learn the speech separation neural network, the speech separation model learning device including: a mixed speech creation unit configured to create, from learning data including speech data of individual speech uttered by each of a plurality of speakers, speech data of mixed speech including speech of the plurality of speakers; a feature amount extraction unit for learning configured to extract time-series data of a speech feature amount of the mixed speech from the speech data of the mixed speech and to extract time-series data of a speech feature amount of the individual speech from the speech data of the individual speech; a mask creation unit configured to create time-series data of a mask of each of the plurality of speakers from the time-series data of the speech feature amount of the mixed speech and the time-series data of the speech feature amount of the individual speech which are extracted by the feature amount extraction unit for learning; and a model learning unit configured to learn the speech separation neural network from the time-series data of the speech feature amount of the mixed speech and the time-series data of the speech feature amount of the individual speech which are extracted by the feature amount extraction unit for learning and from the time-series data of the mask created by the mask creation unit.

According to yet another aspect of the present invention, there is provided a speech separation method for separating, from mixed speech data of mixed speech including speech of a plurality of speakers, speech data of speech of each of the plurality of speakers, the speech separation method including: a feature amount extraction step of extracting time-series data of a speech feature amount of the mixed speech from the mixed speech data; a block division step of dividing the time-series data of the speech feature amount into blocks having a certain time width to generate time-series data of the speech feature amount divided into blocks; a mask creation step of creating, by a speech separation neural network including a combination of an LSTM neural network forward in a time axis direction and an LSTM neural network backward in the time axis direction, time-series data of a mask of each of the plurality of speakers from the time-series data of the speech feature amount divided into blocks; and a speech restoration step of restoring the speech data of the speech of each of the plurality of speakers from the time-series data of the mask and the time-series data of the speech feature amount of the mixed speech, the speech separation neural network being configured to use, when creating the time-series data of the mask of each of the plurality of speakers, the time-series data of a block earlier in time than a present time in the forward LSTM neural network, and the time-series data of a block composed of a predetermined number of frames later in time than the present time in the backward LSTM neural network.

Advantageous Effects of Invention

According to the present invention, the reduction in speech separation accuracy can be lowered while reducing the processing delay in the speech separation.

DESCRIPTION OF EMBODIMENTS

A speech separation device, a speech separation method, a speech separation program, and a speech separation system according to embodiments of the present invention are now described with reference to the drawings. The following embodiments are merely examples, and various modifications can be made thereto within the scope of the present invention.

<1> First Embodiment

<1-1> Configuration

Figure 1:
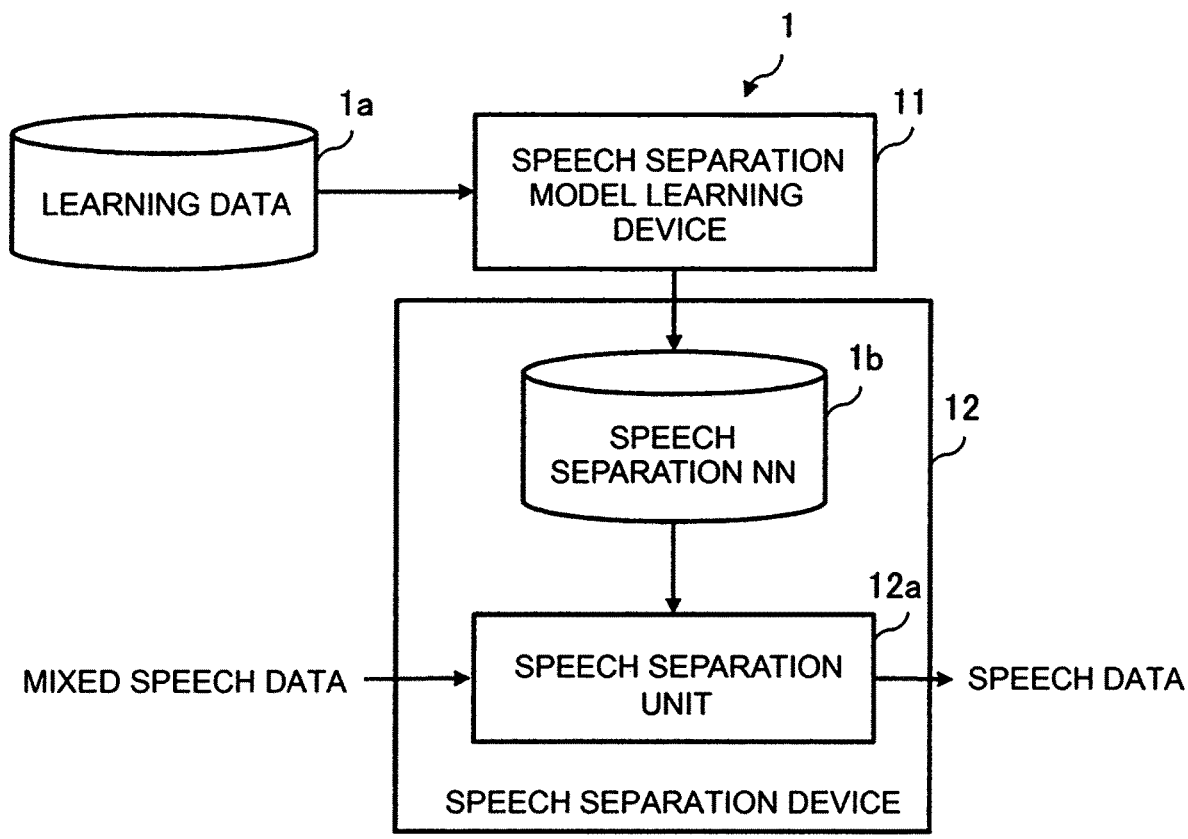
FIG. 1 is a function block diagram for schematically illustrating a configuration of a speech separation system according to a first embodiment of the present invention.

FIG. 1 is a function block diagram for schematically illustrating a configuration of a speech separation system 1 according to a first embodiment of the present invention. As illustrated in FIG. 1, the speech separation system 1 includes a speech separation model learning device 11 and a speech separation device 12.

Learning data 1a is input to the speech separation model learning device 11. The learning data 1a is speech data of speech uttered by a plurality of speakers. The learning data 1a includes the speech data of the speech of each of the plurality of speakers, that is, the speech uttered by one speaker. The speech uttered by one speaker is also referred to as "individual speech." The learning data 1a is, for example, speech data stored in a storage device in advance. The speech separation model learning device 11 is configured to create a speech separation neural network (hereinafter also referred to as "speech separation NN") 1b based on the input learning data 1a. The speech separation NN 1b is stored in a storage device of the speech separation device 12, for example.

The speech separation device 12 includes a speech separation unit 12a configured to use the speech separation NN 1b to separate the speech data of the speech of each speaker from the data of mixed speech including a plurality of pieces of speech of a plurality of speakers, that is, mixed speech data. The mixed speech data of mixed speech including a plurality of pieces of speech uttered by a plurality of speakers is input to the speech separation unit 12a. The mixed speech is speech in which the speech of a plurality of speakers is mixed. The speech separation unit 12a separates the input mixed speech data into the speech data of each of the plurality of speakers by using the speech separation NN 1b. That is, the speech separation device 12 uses the speech separation NN 1b to separate the mixed speech data of a plurality of speakers into the speech data of each speaker.

Figure 2:
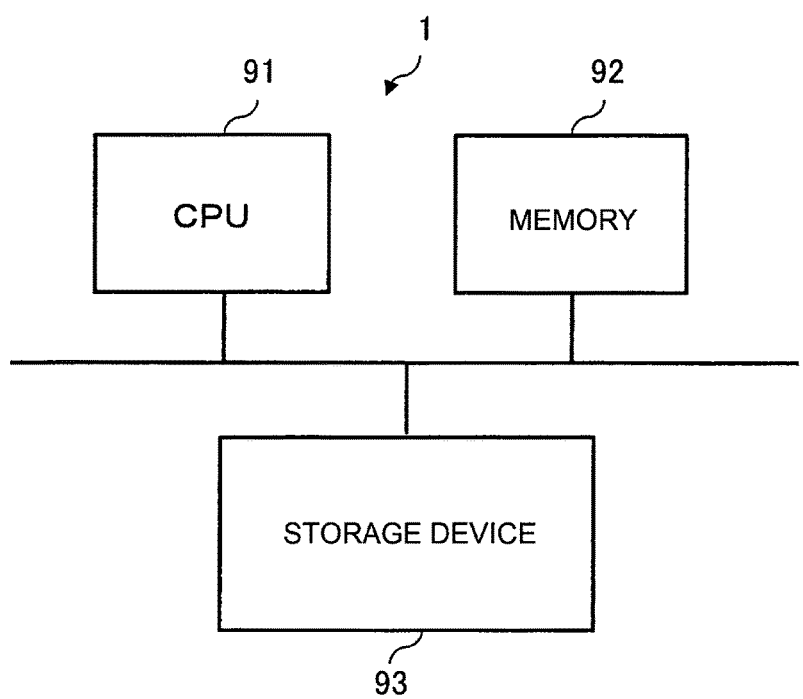
FIG. 2 is a diagram for illustrating an example of a hardware configuration of the speech separation system according to the first embodiment.

FIG. 2 is a diagram for illustrating an example of the hardware configuration of the speech separation system 1 according to the first embodiment. The speech separation system 1 illustrated in FIG. 2 includes a memory 92 serving as a storage unit configured to store programs as software, a Central Processing Unit (CPU) 91 serving as a processor configured to execute the programs stored in the memory 92, and a storage device 93 such as a semiconductor storage device or a hard disk drive (HDD). The memory 92 is a semiconductor memory such as a Read Only Memory (ROM) or a Random Access Memory (RAM), for example.

The speech separation system 1 can be implemented by, for example, a computer. The learning data 1a and the speech separation NN 1b in FIG. 1 can be stored in the storage device 93. However, the learning data 1a and the speech separation NN 1b may be included in an external device connected to the speech separation system 1 such that the external device can communicate to and from the speech separation system 1.

The speech separation model learning device 11 can be implemented by the CPU 91 executing a speech separation model learning program, which is a software program stored in the memory 92. However, the speech separation model learning device 11 may be configured by a processing circuit constructed from a semiconductor integrated circuit. The speech separation model learning device 11 may also be configured by a combination of a processing circuit constructed from a semiconductor integrated circuit and a processor executing a program.

The speech separation unit 12a can be implemented by the CPU 91 executing a speech separation program, which is a software program stored in the memory 92. However, the speech separation unit 12a may be configured by a processing circuit constructed from a semiconductor integrated circuit. The speech separation unit 12a may also be configured by a combination of a processing circuit constructed from a semiconductor integrated circuit and a processor executing a program.

In FIG. 2, a single CPU 91 is illustrated, but the processing for learning the speech separation model and the processing for separating speech may be executed by CPUs that are separate from each other.

Figure 3:
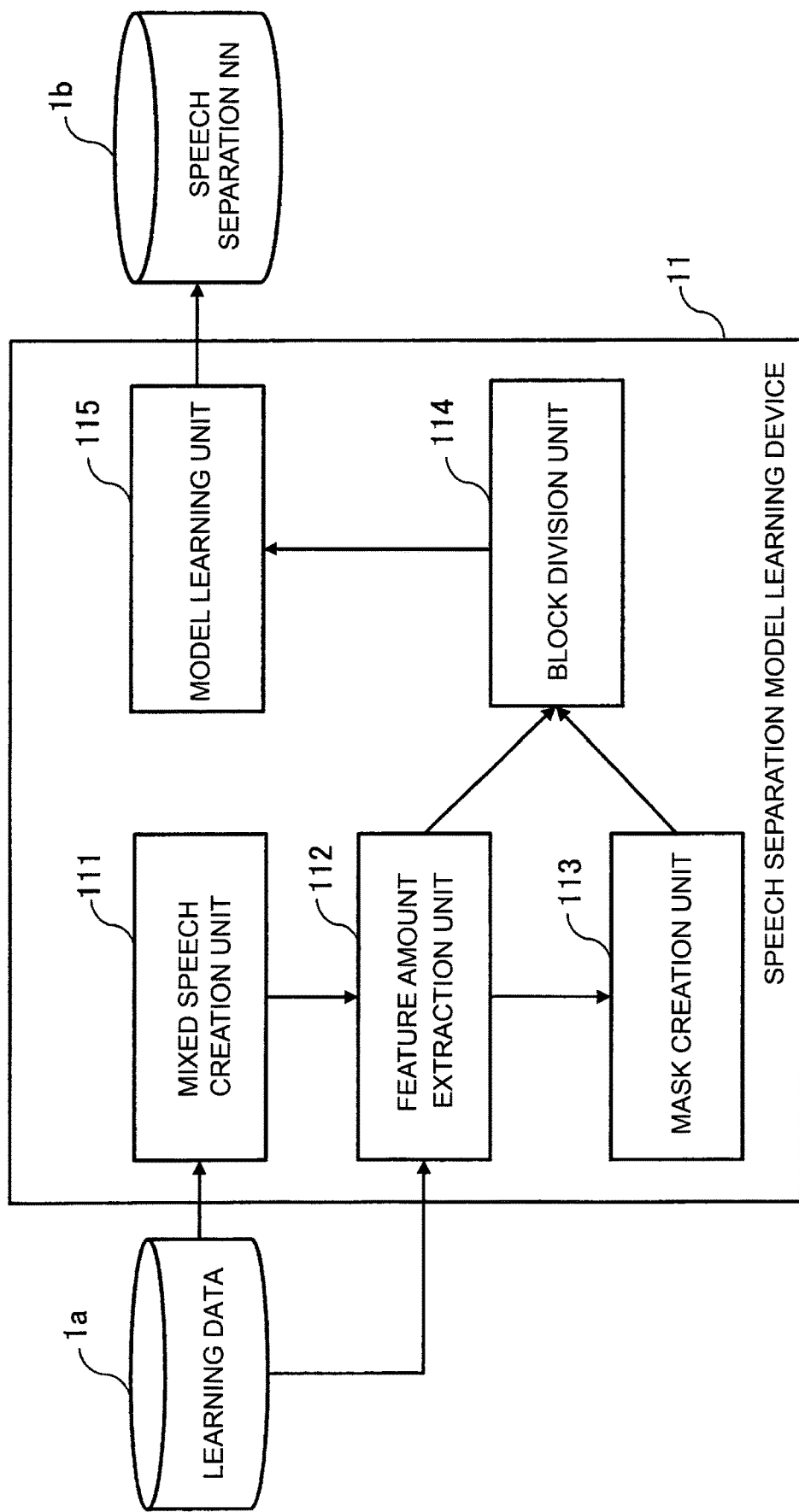
FIG. 3 is a function block diagram for schematically illustrating a configuration of a speech separation model learning device of the speech separation system according to the first embodiment.

FIG. 3 is a function block diagram for schematically illustrating the configuration of the speech separation model learning device 11 of the speech separation system 1 according to the first embodiment. As illustrated in FIG. 3, the speech separation model learning device 11 includes a mixed speech creation unit 111, a feature amount extraction unit (feature amount extraction unit for learning) 112, a mask creation unit 113, a block division unit (block division unit for learning) 114, and a model learning unit 115.

The learning data 1a is input to the mixed speech creation unit 111. The mixed speech creation unit 111 is configured to create mixed speech data of mixed speech of a plurality of speakers by mixing the speech data of the plurality of pieces of speech uttered by the plurality of speakers based on the learning data 1a. That is, the mixed speech creation unit 111 creates mixed speech data from a plurality of pieces of speech data based on the learning data 1a.

The learning data 1a is input to the feature amount extraction unit 112. The mixed speech data created by the mixed speech creation unit 111 is also input to the feature amount extraction unit 112. The feature amount extraction unit 112 is configured to extract a speech feature amount of each speaker from the speech data of each speaker, that is, to create a speech feature amount of each speaker, based on the learning data 1a. Further, the feature amount extraction unit 112 extracts the speech feature amount of mixed speech from the mixed speech data created by the mixed speech creation unit 111, that is, creates a speech feature amount of mixed speech. The speech feature amount is, for example, time-series data of a power spectrum obtained by performing fast Fourier transform (FFT) processing on a speech signal.

The mask creation unit 113 is configured to create a mask from the mixed speech data of the plurality of speakers and the speech data of each of the plurality of speakers. The "mask" is a filter to be used to output the speech feature amount of each speaker from the speech feature amount of the mixed speech. Masks can be roughly classified into two types, namely, soft masks and binary masks. A soft mask can indicate, for each frequency-time bin, in terms of a ratio, a component of the speech feature amount of the speech of each speaker included in the speech feature amount of the mixed speech of the plurality of speakers. A binary mask can indicate the dominant speaker for each frequency-time bin in binary representation. A mask is created at each time point of the time-series data of the speech feature amount. That is, the speech feature amount is time-series data, and the mask is also time-series data.

The block division unit 114 is configured to divide the time-series data of the speech feature amount extracted by the feature amount extraction unit 112 into blocks in the time axis direction. The block division unit 114 is configured to divide the time-series data of the mask created by the mask creation unit 113 into blocks in the time axis direction. The "blocks" are time-series data obtained by cutting the time-series data at a constant time width in the time axis direction. The time width of one block is referred to as "block length."

The model learning unit 115 is configured to learn the speech separation NN 1b in block units by using the time-series data of the mask divided into blocks and the time-series data of the speech feature amount divided into blocks. The time-series data of the mask divided into blocks is also referred to as "block mask time-series data." The time-series data of the speech feature amount divided into blocks is also referred to as "block speech feature amount time-series data."

The speech separation model learning device 11 is not required to include the block division unit 114. When the speech separation model learning device 11 does not include the block division unit 114, the model learning unit 115 learns the speech separation model based on all of the uttered speech when learning the speech separation model, and the speech separation device 12 performs the block processing for dividing each of the time-series data of the speech feature amount and the time-series data of the mask into blocks in the time axis direction during speech separation.

Figure 4:
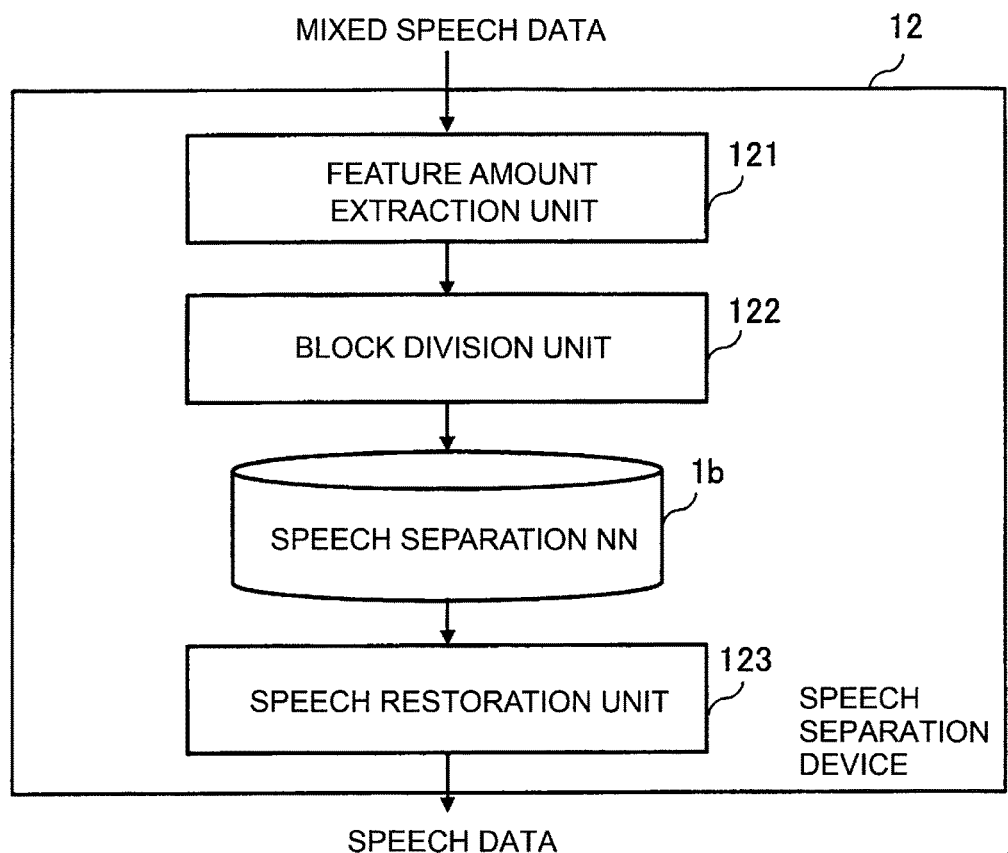
FIG. 4 is a function block diagram for schematically illustrating a configuration of a speech separation device of the speech separation system according to the first embodiment.

FIG. 4 is a function block diagram for schematically illustrating the configuration of the speech separation device 12 of the speech separation system 1 according to the first embodiment. As illustrated in FIG. 4, the speech separation device 12 includes a feature amount extraction unit 121, a block division unit (block division unit for speech separation) 122, the speech separation NN 1b, and a speech restoration unit 123. The feature amount extraction unit 121, the block division unit 122, and the speech restoration unit 123 form the speech separation unit 12a illustrated in FIG. 1.

Mixed speech data is input to the feature amount extraction unit 121. The feature amount extraction unit 121 is configured to extract the speech feature amount of the mixed speech from the input mixed speech data, that is, to create the speech feature amount of the mixed speech. The speech feature amount is, for example, time-series data of a power spectrum obtained by performing FFT processing on a speech signal. The feature amount extraction unit 121 has the same configuration as that of the feature amount extraction unit 112 of the speech separation model learning device 11 illustrated in FIG. 3.

The block division unit 122 is configured to divide the time-series data of the speech feature amount extracted by the feature amount extraction unit 121 into blocks in the time axis direction. The speech feature amount divided into blocks is also referred to as "spectrum feature amount." The block division unit 122 estimates the time-series data of the mask by inputting the spectrum feature amount into the speech separation NN 1b. That is, the block division unit 122 uses the speech separation NN 1b to create the time-series data of the mask from the spectrum feature amount. The block division unit 122 has the same configuration as that of the block division unit 114 of the speech separation model learning device 11 illustrated in FIG. 3.

The speech restoration unit 123 is configured to apply the time-series data of the obtained mask to the time-series data of the spectrum feature amount of the mixed speech. The speech restoration unit 123 restores the speech data of one speaker from the mixed speech data by, for example, performing inverse fast Fourier transform (inverse FFT) processing on the time-series data of the spectrum feature amount.

Figure 5:
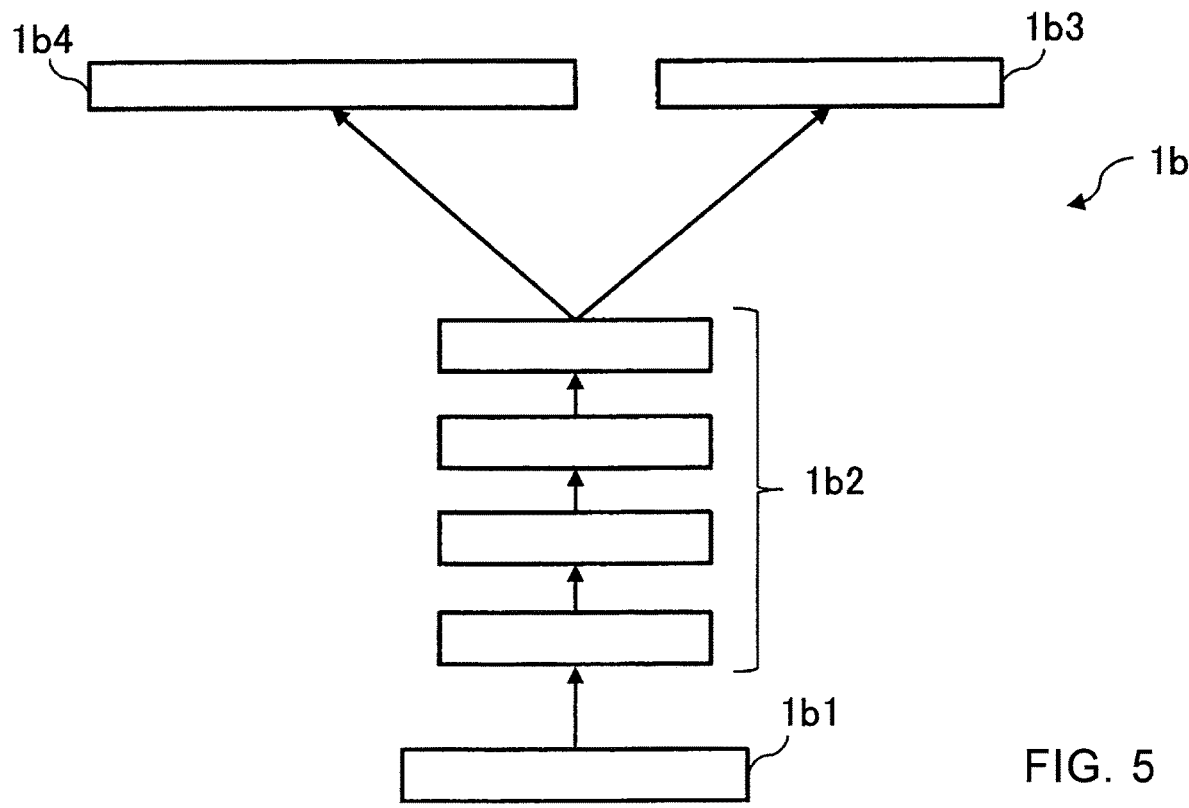
FIG. 5 is a diagram for illustrating an example of the structure of a speech separation neural network of the speech separation system according to the first embodiment.

FIG. 5 is a diagram for illustrating the structure of the speech separation NN 1b of the speech separation system 1 according to the first embodiment. The time-series data of the speech feature amount of the mixed speech is input to the speech separation NN 1b. The speech separation NN 1b can estimate the mask of each speaker and the embedded vector of each speaker included in the mixed speech data. When speech separation is performed in the speech separation device 12, the speech separation NN 1b uses the mask of each speaker, but does not use the embedded vector of each speaker. However, the speech separation NN 1b may also learn such that the mask of each speaker and the embedded vector of each speaker are both estimated. In this case, the estimation accuracy of the speech of each speaker based on the mask is improved. A technology using the embedded vector is itself publicly known, and is described in, for example, Non-Patent Literature 1.

As illustrated in FIG. 5, the speech separation NN 1b has an input layer 1b1, intermediate layers 1b2, a mask output layer 1b3, and an embedded vector output layer 1b4. The structure of the mask output layer 1b3 and the embedded vector output layer 1b4, that is, the structure of a neural network having two output layers, is referred to as "chimera structure." The input layer 1b1, the intermediate layers 1b2, the mask output layer 1b3, and the embedded vector output layer 1b4 are each constructed from a plurality of units. For example, each unit is a part for calculating a threshold value, and the threshold value is used to determine whether or not a sum obtained by multiplying the inputs of the units by a weighting of a combined load exceeds a threshold value. For example, when the sum exceeds the threshold value, the unit outputs 1, and when the sum does not exceed the threshold value, the unit outputs 0. The input layer 1b1 has the same number of units as the number of dimensions of the mixed speech spectrum feature amount, which is the spectrum feature amount that is the speech feature amount of the input mixed speech. The number of units and the number of layers of the intermediate layers 1b2 can be set to any number. The mask output layer 1b3 has the same number of units as the number of units of the input layer 1b1. The embedded vector output layer 1b4 has the number of units obtained by multiplying the number of units of the input layer 1b1 by the number of dimensions of the embedded vector, which can be set to any number.

<1-2> Operation of Speech Separation Model Learning Device 11

Figure 6:
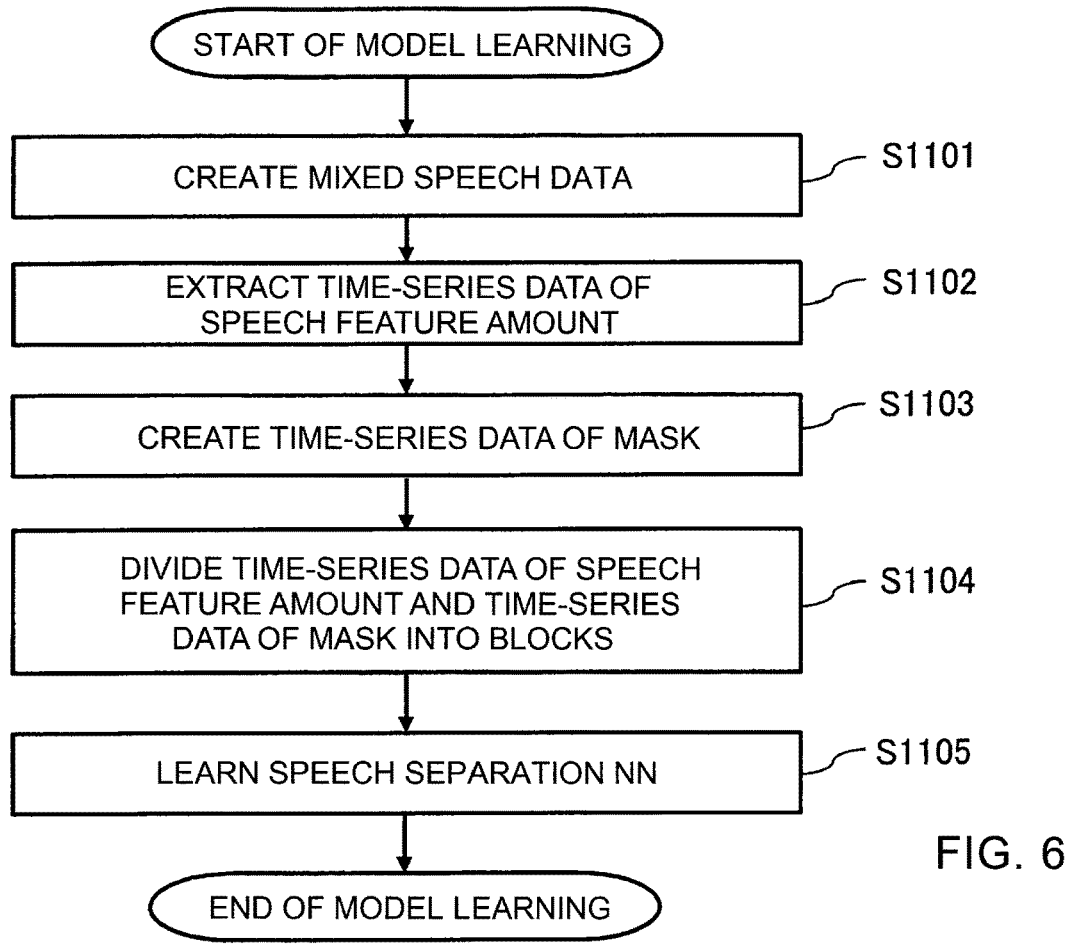
FIG. 6 is a flowchart for illustrating operation of the speech separation model learning device illustrated in FIG. 3.

Learning of the speech separation model by the speech separation model learning device 11 is described below. FIG. 6 is a flowchart for illustrating operation of the speech separation model learning device 11.

First, the mixed speech creation unit 111 creates the mixed speech data by using the learning data 1a to add the speech data of a plurality of speakers different from each other (Step S1101).

Next, the feature amount extraction unit 112 extracts the time-series data of the speech feature amount from the mixed speech data of the plurality of speakers and the speech data of each speaker before mixing (Step S1102). The speech feature amount is, for example, a power spectrum obtained by performing FFT processing on the speech signal.

Next, the mask creation unit 113 creates a mask from the speech feature amount of the speech before mixing and the speech feature amount of the speech after mixing (Step S1103). The mask created by the mask creation unit 113 is, for example, a soft mask. Soft masks are publicly known. As the soft mask, for example, the mask described in Non-Patent Literature 1 can be used. The mask created by the mask creation unit 113 is created at each time point of the time-series data of the speech feature amount. That is, the mask created by the mask creation unit 113 is time-series data.

Next, the block division unit 114 divides the time-series data of the speech feature amount of the mixed speech data and the time-series data of the mask created by the mask creation unit 113 into blocks in the time axis direction (Step S1104).

Figure 7:
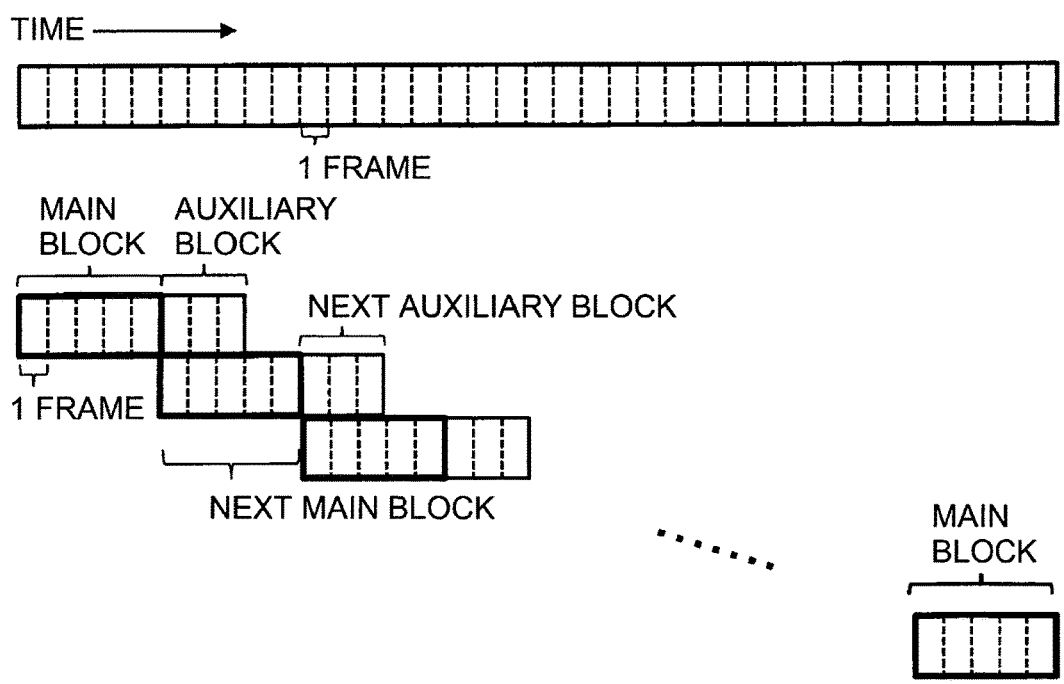
FIG. 7 is a diagram for schematically illustrating an example of block division by a block division unit of the speech separation model learning device and a block division unit of the speech separation device.

FIG. 7 is a diagram for illustrating how the block division unit 114 in the speech separation model learning device 11 of the speech separation system 1 according to the first embodiment divides the speech feature amount into blocks. In FIG. 7, main blocks composed of 5 frames indicated by thick lines and auxiliary blocks composed of 3 frames indicated by thin lines are sequentially divided from the time-series data of the speech feature amount. The main blocks are continuous with each other in the time axis direction. The auxiliary blocks may be continuous with each other in the time axis direction. Each main block is composed of the number of frames determined in advance. Each auxiliary block is composed of the number of frames determined in advance. The auxiliary block follows the main block. A main block divided after a certain main block is continuous in time with the immediately preceding main block. That is, the frame at the trailing end of a main block is continuously followed by the frame at the leading end of the next main block.

Returning to the description of FIG. 6, the model learning unit 115 learns a speech separation NN as a speech separation model from the speech feature amount and the mask of the mixed speech (Step S1105). As used herein, "learning a neural network" means performing the process of determining an input weighting coefficient that is a parameter of the neural network. The speech feature amount of the mixed speech is input to the input layer 1b1 of the speech separation NN 1b of FIG. 5, passes through the intermediate layers 1b2, and propagates to the mask output layer 1b3 and the embedded vector output layer 1b4.

The value propagated from the final layer of the intermediate layers 1b2, that is, from the uppermost layer of the intermediate layers 1b2 in FIG. 5, to the mask output layer 1b3 and the embedded vector output layer 1b4 is calculated as follows, for example. The uppermost layer of the intermediate layers 1b2 in FIG. 5 is obtained by multiplying the output value of each of the plurality of units in the second uppermost layer of the intermediate layers 1b2 in FIG. 5 by the input weighting coefficient and adding the plurality of values obtained by multiplying by the input weighting coefficient to acquire an added value. A value obtained by converting the added value by a non-linear function is output to the mask output layer 1b3 and the embedded vector output layer 1b4. As the non-linear function, for example, a logistic sigmoid function is used.

The propagation of the speech separation NN 1b among the layers other than the uppermost layer of the intermediate layer 1b2 can be performed by a method similar to LSTM.

The mask estimated by the mask output layer 1b3 and the embedded vector estimated by the embedded vector output layer 1b4 are input to the loss function described in Non-Patent Literature 1. As a result, an error is calculated based on the mask created by the mask creation unit 113. The mask output layer 1b3 uses an optimization method, for example, adaptive moment estimation (Adam) to learn the weighting coefficient of the input of each of the input layer 1b1, the intermediate layers 1b2, the mask output layer 1b3, and the embedded vector output layer 1b4 of the speech separation NN 1b based on a backward error propagation (BP) method, for example.

<1-3> Operation of Speech Separation Device 12

Figure 8:
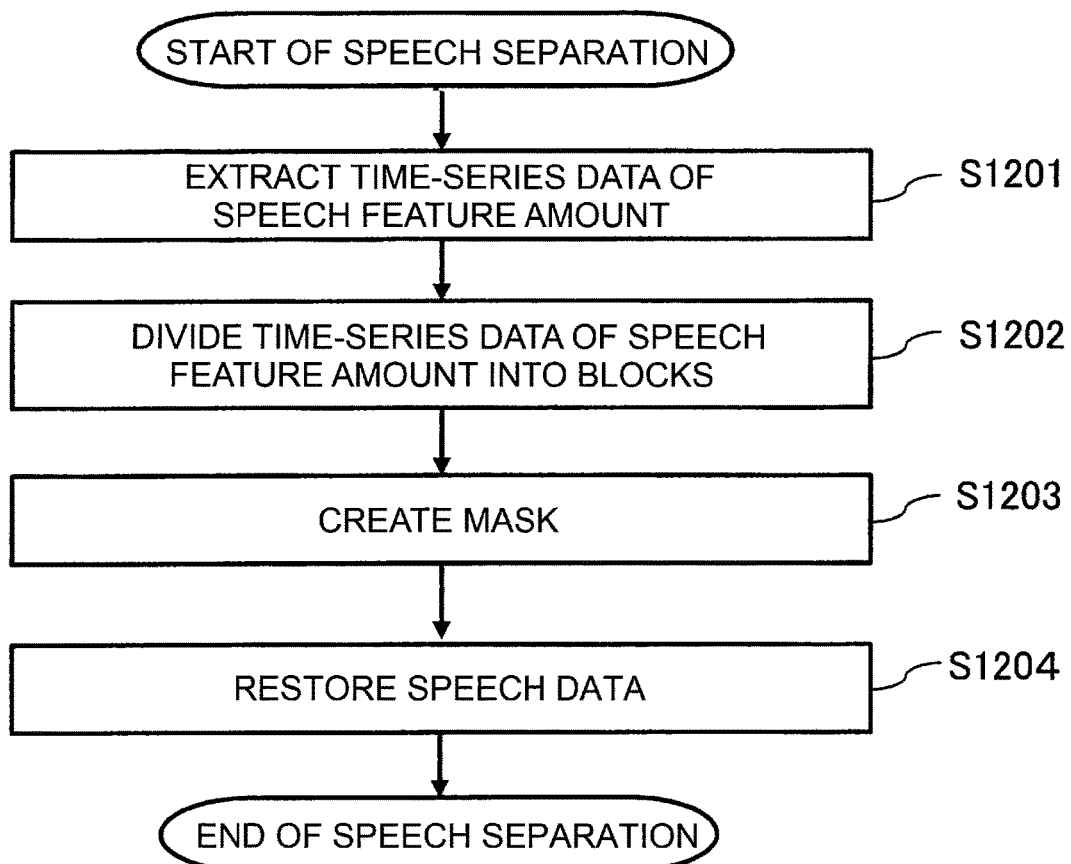
FIG. 8 is a flowchart for illustrating operation of the speech separation device illustrated in FIG. 4.

Next, operation of the speech separation device 12 is described. FIG. 8 is a flowchart for illustrating operation of the speech separation device 12 according to the first embodiment.

First, the feature amount extraction unit 121 outputs time-series data of speech feature amount from the mixed speech (Step S1201). In this step, the speech feature amount is, for example, a power spectrum obtained by performing FFT processing on the speech signal.

Next, the block division unit 122 divides the time-series data of the speech feature amount obtained from the mixed speech into blocks in the time axis direction (Step S1202).

The speech feature amount divided into blocks is input to the speech separation NN 1b. The speech separation NN 1b estimates a mask, that is, creates a mask (Step S1203). The speech separation NN 1b has a chimera structure as illustrated in FIG. 5. The propagation of the speech feature amount divided into blocks from the input layer 1b1 to the final layer of the intermediate layer 1b2 is performed using the neural network composed of a latency controlled-bidirectional long short time memory (LC-BLSTM), which is similar to the block processing method of the BLSTM neural network. The neural network composed of a LC-BLSTM is also referred to as "LC-BLSTM neural network." The propagation of the speech feature amount among the other layers is the same as the propagation described with reference to FIG. 6. In the speech separation processing illustrated in FIG. 8, it is possible to use only the output of the mask output layer 1b3 among the outputs of the speech separation NN 1b illustrated in FIG. 5.

Figure 9:
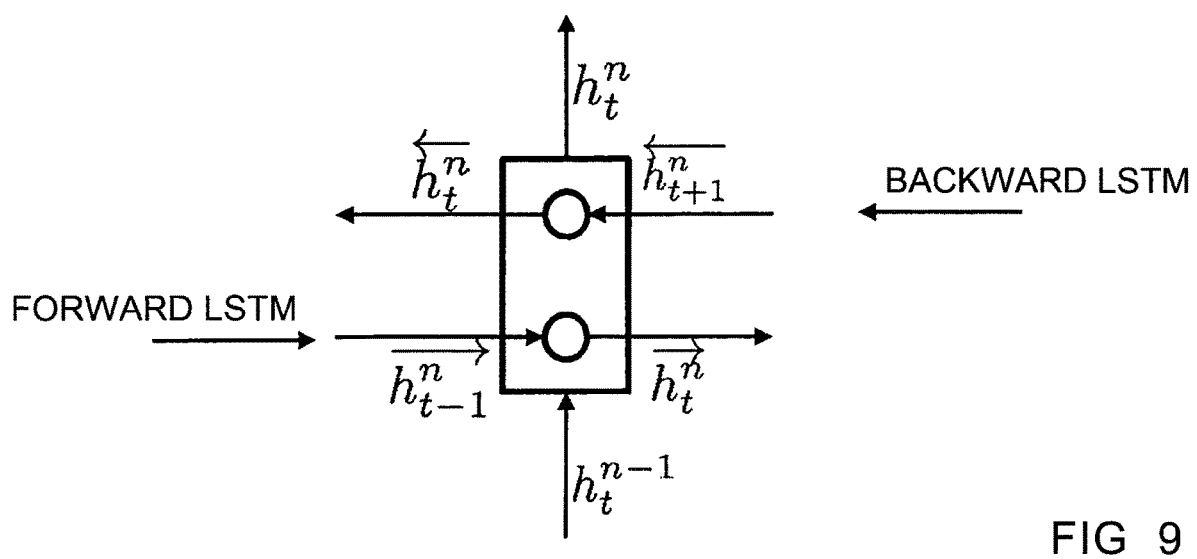
FIG. 9 is a diagram for illustrating a schematic structure of a BLSTM neural network.

FIG. 9 is a diagram for illustrating a schematic structure of a BLSTM neural network. When the current frame is assumed to be a t-th (t is a positive integer) frame, the output of an n-th (n is a positive integer) layer of the t-th frame is expressed by the following expression (1).

$$h_t^n \qquad (1)$$

The BLSTM neural network is composed of a combination of a forward LSTM neural network and a backward LSTM neural network. The output of the forward LSTM neural network in the n-th layer of the t-th frame is expressed by the following expression (2).

The output of the backward LSTM neural network in $$\overrightarrow{h_t^n} \quad (2)$$

the n-th layer of the t-th frame is expressed by the following $$\overleftarrow{h_t^n} \quad (3)$$

expression (3).

As illustrated in FIG. 9, the output of the n-th layer of the t-th frame is obtained by combining the output of the forward LSTM neural network in the n-th layer of the t-th frame and the output of the backward LSTM neural network in the n-th layer of the t-th frame.

As illustrated in FIG. 9, the inputs and the output of the forward LSTM neural network are expressed by the following expressions (4) and (5), respectively.

$$\text{Inputs: } \overrightarrow{h_{t-1}^n} \text{ and } h_t^{n-1} \quad (4)$$

$$\text{Output: } \overrightarrow{h_t^n} \quad (5)$$

Further, as illustrated in FIG. 9, the inputs and the output of the backward LSTM neural network are expressed by the following expressions (6) and (7), respectively.

$$\text{Inputs: } \overleftarrow{h_{t+1}^n} \text{ and } h_t^{n-1} \quad (6)$$

$$\text{Output: } \overleftarrow{h_t^n} \quad (7)$$

As illustrated in FIG. 9, the output of the following expression (8) is obtained as the output of the n-th layer of the t-th frame by connecting the outputs of both LSTM neural networks.

As described above, in the BLSTM neural network, in order to obtain the output of the n-th layer of the t-th frame, $$h_t^n \quad (8)$$

the output of the (t−1)th frame and the output of the (t+1)th frame are both used as the input for the forward LSTM neural network and the input for the backward LSTM neural network. That $$\overrightarrow{h_{t-1}^n}, \overleftarrow{h_{t+1}^n} \quad (9)$$

is, in the BLSTM neural network, the two outputs from the following expression (9) are used.

Therefore, in the BLSTM neural network illustrated in FIG. 9, the speech separation processing can be performed only after all of the uttered speech is input. That is, a delay occurs in the speech separation processing.

Figure 10:
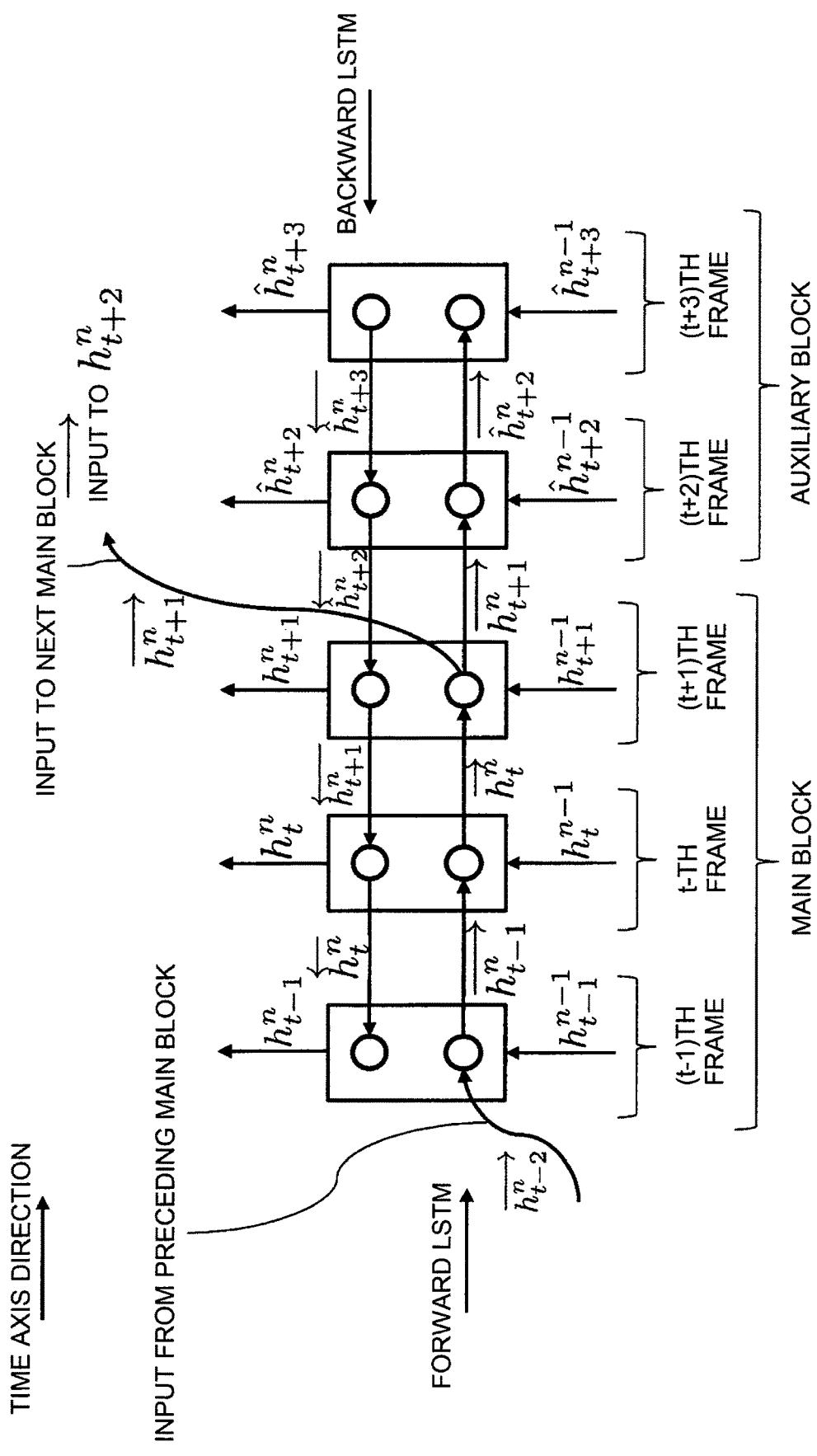
FIG. 10 is a diagram for illustrating a schematic structure of an LC-BLSTM neural network forming the speech separation neural network in the first embodiment.

FIG. 10 is a diagram for illustrating a schematic structure of an LC-BLSTM neural network forming the speech separation NN 1b of the speech separation system 1 according to the first embodiment. In FIG. 10, the outputs of the auxiliary blocks are indicated by using, for example, a circumflex (^) symbol. For example, the output of the auxiliary block of the (t+2)th frame of the n-th layer and the output of the auxiliary $$\hat{h}_{t+2}^n, \hat{h}_{t+3}^n \quad (10)$$

block of the (t+3)th frame of the n-th layer are expressed by the following expression (10).

In the forward LSTM neural network, the main block of the (t−1)th frame, which is the first frame, receives the output of the main block of the preceding (t−2)th frame (not shown). The output of the main block of the (t+1)th frame, which is the last frame, is input to the next main block, that is, the main block of the (t+2)th frame (not shown).

In FIG. 10, the output of the main block of the preceding (t−2)th frame (not shown) is expressed by the following expression (11).

$$\overrightarrow{h_{t-2}^n} \quad (11)$$

This output is input to the leading frame of the current main block, that is, the main block of the (t−1)th frame.

In FIG. 10, the output to be input to the first frame of the next main block, that is, the main block of the (t+2)th frame (not shown), is the output of the following expression (12).

$$\overrightarrow{h_{t+1}^n} \quad (12)$$

As illustrated in FIG. 10, in the backward LSTM neural network, the output to be input to the last frame of the auxiliary block, that is, the (t+2)th frame, is taken as the input of the first frame of the main block. In FIG. 10, the output of the last frame of the auxiliary block, that is, the $$\overleftarrow{h_{t+2}^n} \quad (13)$$

(t+2)th frame, is the output of the following expression (13).

As illustrated in FIG. 10, use of the LC-BLSTM neural network as the speech separation NN 1b for processing enables the processing delay to be reduced as compared with a case in which the BLSTM neural network illustrated in FIG. 9 is used as the speech separation NN 1b for processing. Further, as illustrated in FIG. 10, use of the LC-BLSTM neural network as the speech separation NN 1b for processing enables the time of the processing delay to be the sum of the block length of the main block and the block length of the auxiliary block illustrated in FIG. 10.

The role of the auxiliary blocks is now described by focusing on the backward LSTM neural network. In FIG. 10, when there are no auxiliary blocks, the main blocks cannot receive information on the (t+2)th frame of the n-th layer in FIG. 10, that is, information on a future frame. More specifically, the main block cannot receive the output of the following expression (14) of the auxiliary block.

$$\overleftarrow{h_{t+2}^n} \quad (14)$$

In this case, for the frames before the (t+1)th frame as well, the backward LSTM neural network receives a smaller amount of information than in the case in which there is an auxiliary block. In the example illustrated in FIG. 10, due to the effect of the auxiliary block, the backward LSTM neural network includes information on the future frames, and therefore can receive a large amount of information.

Returning to the description of FIG. 8, the speech restoration unit 123 multiplies each element of the speech feature amount of the mixed speech by each element of the corresponding mask to convert the speech feature amount into a separated speech feature amount. Then, the speech restoration unit 123 restores the speech feature amount into the speech signal by performing inverse FFT processing, for example (Step S1204).

When the speech separation model learning device 11 does not include the block division unit 114, the model learning unit 115 learns the neural network by using, as inputs, all of the time-series data of the speech feature amount of the mixed speech that is not divided into blocks and the time-series of the mask. Meanwhile, in the speech separation device 12, block division is performed by the feature amount extraction unit 121, and hence the data structure at the time of learning the speech separation model is different from the data structure at the time of speech separation. Therefore, when the speech separation model learning device 11 does not include the block division unit 114, the speech separation accuracy may be lower than a case in which the speech separation model learning device 11 includes the block division unit 114. As a result, it is desired that the speech separation model learning device 11 include the block division unit 114.

<1-4> Effects

As described above, in the first embodiment, the speech separation model learning device 11 learns the speech separation NN 1b. The speech separation device 12 divides the time-series data of the extracted speech feature amount into blocks in the time axis direction. The speech feature amount blocks are propagated through the speech separation NN 1b, which is an LC-BLSTM neural network, and converted into the time-series data of a mask. The speech separation device 12 restores the speech data of each speaker by using the time-series data of the mask obtained in this manner. The speech separation NN 1b performs processing in block units in the time axis direction, and therefore the speech separation device 12 can reduce the processing delay as compared to a device using a BLSTM neural network performing processing after all of the speech data is input. That is, according to the first embodiment, the mask and the embedded vector of each speaker required for the speech separation are estimated by the speech separation NN 1b composed of an LC-BLSTM neural network having a shorter processing delay, and therefore the processing delay can be reduced.

Further, the speech separation device 12 uses the speech separation NN 1b composed of an LC-BLSTM neural network, and hence it is possible to lower a reduction in speech separation accuracy. That is, the LC-BLSTM neural network has main blocks and auxiliary blocks, and can therefore propagate information obtained from the auxiliary blocks to a backward LSTM neural network. It is therefore possible to lower a reduction in speech separation accuracy.

<2> Second Embodiment

In the speech separation system 1 according to the first embodiment, the speech separation device 12 uses the speech separation NN 1b composed of an LC-BLSTM neural network during speech separation. When the LC-BLSTM neural network is used, the speech separation accuracy changes depending on the block length of the LC-BLSTM neural network. In a speech separation system according to a second embodiment of the present invention, the speech separation device has a function of selecting an LC-BLSTM neural network having a block length suitable for the input speech feature amount.

Figure 11:
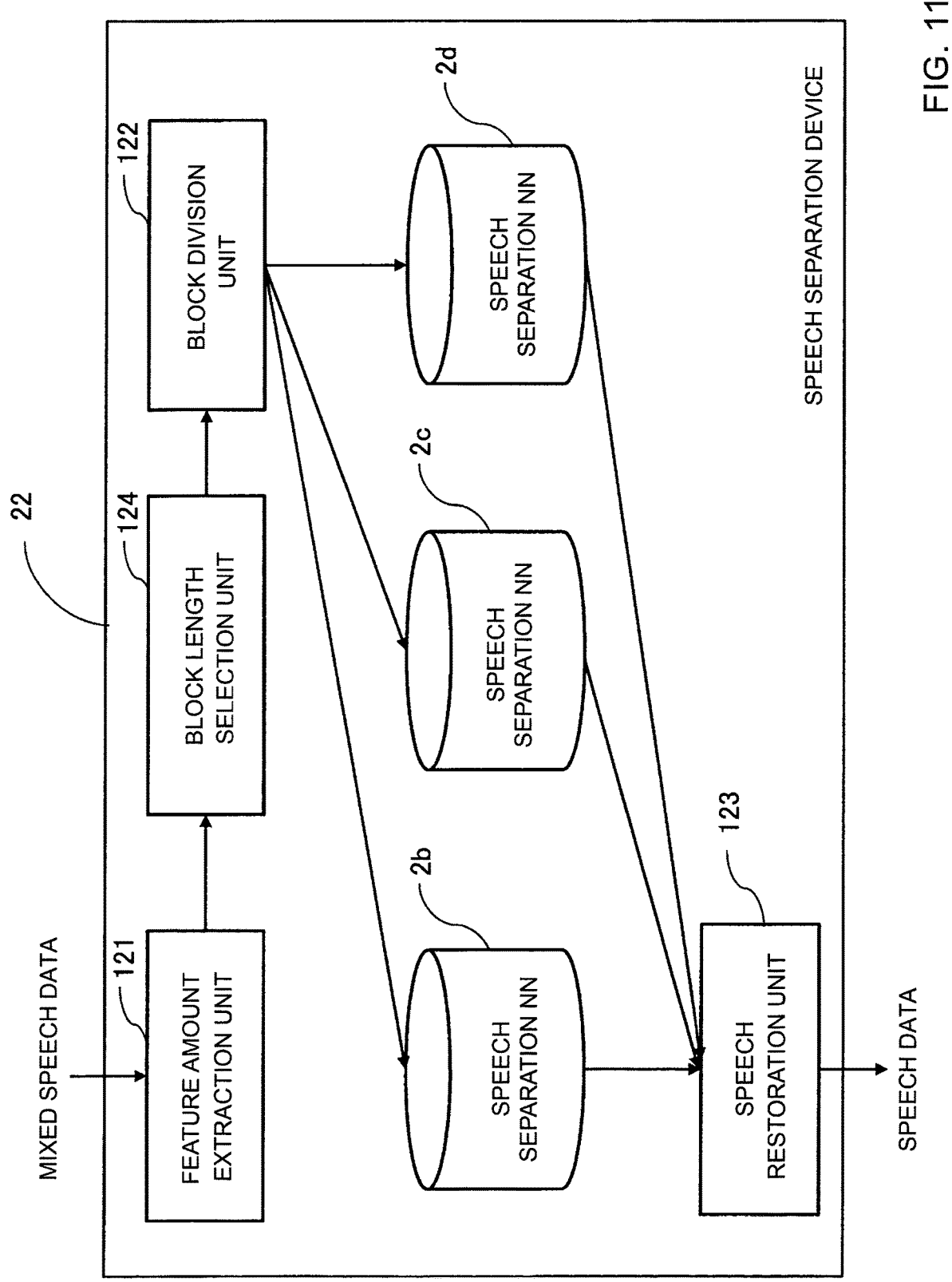
FIG. 11 is a function block diagram for schematically illustrating a configuration of a speech separation device of a speech separation system according to a second embodiment of the present invention.

FIG. 11 is a function block diagram for schematically illustrating a configuration of a speech separation device 22 of the speech separation system according to the second embodiment. In FIG. 11, components that are the same as or correspond to the components illustrated in FIG. 4 are denoted by the same reference numerals or reference symbols as in FIG. 4. The speech separation device 22 according to the second embodiment differs from the speech separation device 12 according to the first embodiment in that a block length selection unit 124 and a plurality of speech separation NNs 2b, 2c, and 2d are included.

Figure 12:
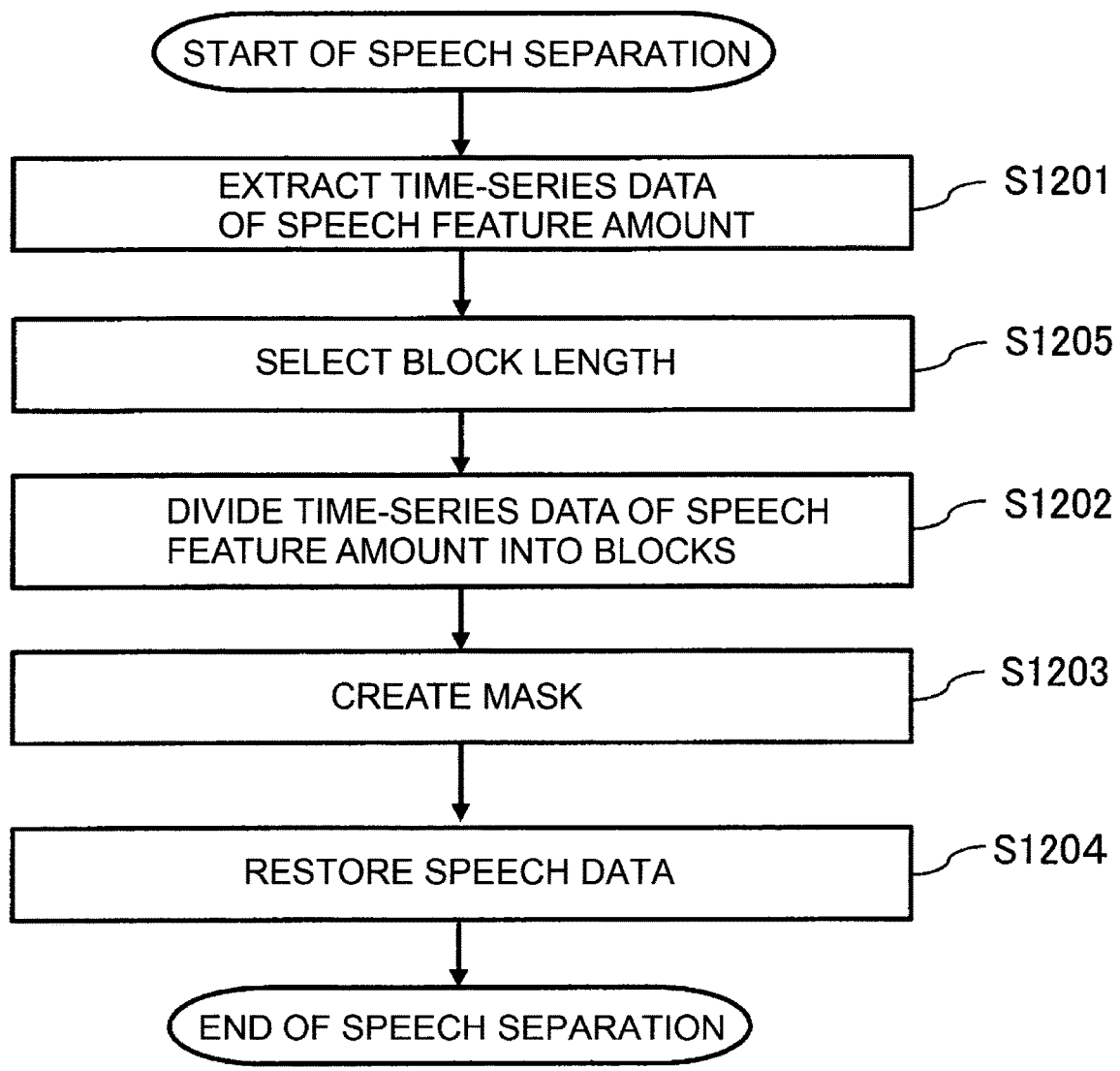
FIG. 12 is a flowchart for illustrating operation of the speech separation device illustrated in FIG. 11.

FIG. 12 is a flowchart for illustrating operation of the speech separation device 22 of the speech separation system according to the second embodiment. In FIG. 12, processing steps that are the same as or correspond to the processing steps of FIG. 8 are denoted by the same step numbers as the step numbers of FIG. 8. Operation of the speech separation device 22 according to the second embodiment differs from operation of the speech separation device 12 according to the first embodiment in terms of having processing of selecting a block length (Step S1205).

The block length selection unit 124 is configured to select an optimum block length empirically determined in advance in accordance with noise or reverberation included in the time-series data of the speech feature amount of the mixed speech. In the selection of the optimum block length, for example, information indicating a correspondence relationship between an S/N ratio of noise or a reverberation time and the block length is empirically determined in advance, and the block length selection unit 124 selects the speech separation NN to be used from the speech separation NNs 2b, 2c, and 2d in accordance with the information indicating the correspondence relationship empirically determined in advance. The information indicating the correspondence relationship is stored in the storage device as a table, for example. The block division unit 122 divides the time-series data of the speech feature amount into blocks having a time width in accordance with the selected block length, and estimates a mask by using the speech separation NN matching the selected block length from among the speech separation NNs 2b, 2c, and 2d.

As described above, in the speech separation device 22 according to the second embodiment, the block length selection unit 124 selects the block length in accordance with the speech feature amount of the mixed speech, and uses the speech separation NN matching the block length. Through the selection of a suitable block length in accordance with the speech feature amount, better speech separation accuracy can be achieved compared with a case in which the block length is fixed. For example, it is possible to improve the speech separation accuracy by increasing the block length. Further, the processing delay can be reduced by shortening the block length.

Except for the points described above, the second embodiment is the same as the first embodiment.

<3> Third Embodiment

<3-1> Configuration

The amount of information that can be obtained by an LSTM neural network and an LC-BLSTM neural network is less than the amount of information that can be obtained by a BLSTM neural network. Therefore, a speech separation device using a speech separation NN composed of an LC-BLSTM neural network may have lower speech separation accuracy.

Therefore, a speech separation model learning device 31 of a speech separation system according to a third embodiment of the present invention uses teacher-student learning in which, during creation of a speech separation NN, a student neural network (hereinafter also referred to as "student NN") learns a teacher neural network (hereinafter also referred to as "teacher NN"). Teacher-student learning is a learning method in which the student NN imitates the output of the teacher NN or the weighting of the intermediate layers. In teacher-student learning, a student NN is used, and hence it is possible to reduce the number of parameters by using the teacher-student learning. For example, a BLSTM neural network can be trained as the teacher NN, and an LSTM neural network or an LC-BLSTM neural network can be trained as the student NN. In this case, the information in the BLSTM neural network can be reflected in the LSTM neural network. In this case, the speech separation accuracy can be improved as compared with a case in which the teacher-student learning is not used.

Figure 13:
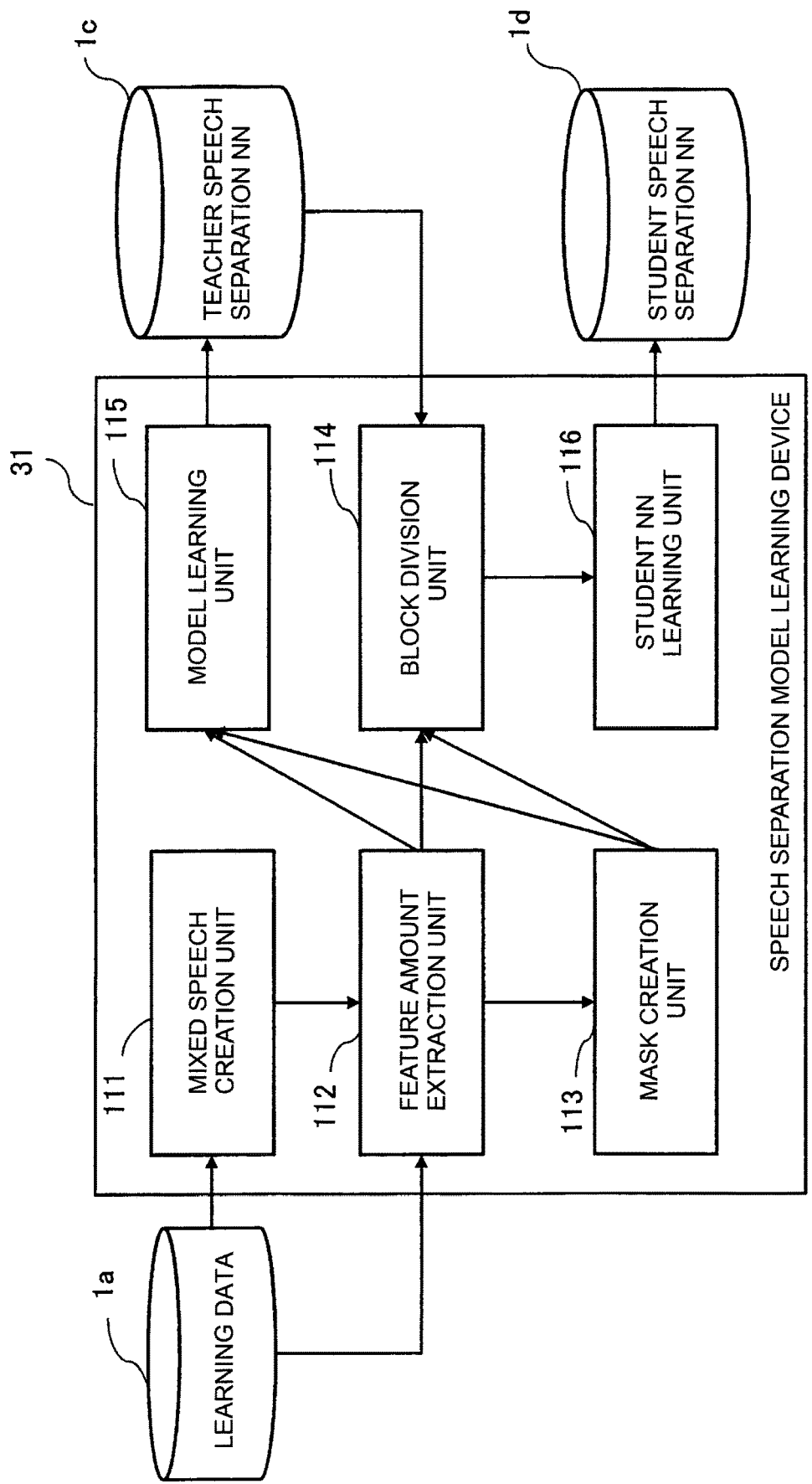
FIG. 13 is a function block diagram for schematically illustrating a configuration of a speech separation model learning device of a speech separation system according to a third embodiment of the present invention.

FIG. 13 is a function block diagram for schematically illustrating the configuration of the speech separation model learning device 31 of the speech separation system according to the third embodiment. In FIG. 13, components that are the same as or correspond to the components illustrated in FIG. 3 are denoted by the same reference numerals or reference symbols as in FIG. 3. The speech separation model learning device 31 according to the third embodiment is different from the speech separation model learning device 11 according to the first embodiment in that a student NN learning unit 116 is included and in that a plurality of speech separation NNs are generated. In FIG. 13, the plurality of speech separation NNs are a teacher speech separation neural network (hereinafter also referred to as "teacher speech separation NN") 1c and a student speech separation neural network (hereinafter also referred to as "student speech separation NN") 1d.

In the third embodiment, the model learning unit 115 learns the teacher speech separation NN 1c as a speech separation model. The teacher speech separation NN 1c is configured to create the time-series data of the speech feature amount of the mixed speech and the time-series data of the mask. The mask created by the teacher speech separation NN 1c is also referred to as "teacher mask."

The student NN learning unit 116 is configured to learn the student speech separation NN 1d as a speech separation model based on the output of the teacher speech separation NN 1c and the time-series data of the speech feature amount of the mixed speech and the time-series data of the teacher mask divided by the block division unit 114. The student speech separation NN 1d creates the time-series data of the speech feature amount of the mixed speech and the time-series data of the mask.

<3-2> Operation

Figure 14:
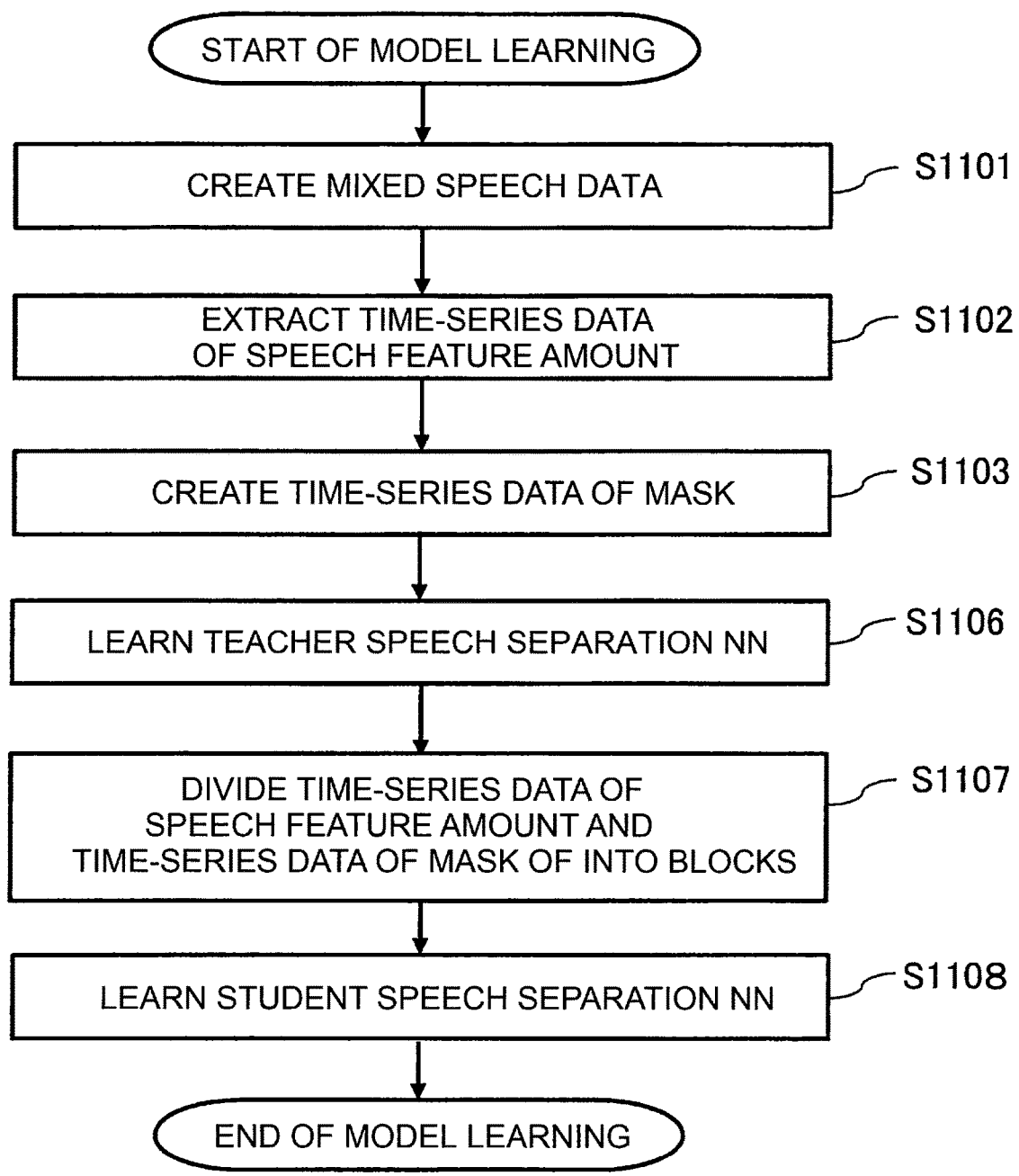
FIG. 14 is a flowchart for illustrating operation of the speech separation model learning device illustrated in FIG. 13.

FIG. 14 is a flowchart for illustrating operation of the speech separation model learning device 31 of the speech separation system according to the third embodiment. In FIG. 14, processing steps that are the same as or correspond to the processing steps of FIG. 6 are denoted by the same step numbers as the step numbers of FIG. 6. In FIG. 14, the processing of Step S1101 to Step S1103 is the same as the corresponding processing of FIG. 6.

Next, the model learning unit 115 learns the teacher speech separation NN 1c from the speech feature amount of the mixed speech and the teacher mask (Step S1106). The teacher speech separation NN 1c is, for example, a BLSTM neural network having a chimera structure.

The block division unit 114 divides the time-series data of the speech feature amount of the mixed speech, the time-series data of the teacher mask, and the teacher data obtained from the teacher speech separation NN 1c into blocks (Step S1107). Details of the teacher data obtained from the teacher speech separation NN 1c are described later.

The student NN learning unit 116 uses the speech feature amount of the mixed speech, the teacher mask, and the teacher data obtained from the teacher speech separation NN 1c, which have been divided into blocks by the block division unit 114, to learn the student speech separation NN 1d as a speech separation model (Step S1108). When a neural network that does not require block processing, for example, an LSTM neural network, is used for the student speech separation NN 1d, the block processing by the block division unit 114 can be omitted. When the block processing by the block division unit 114 is not performed, the student speech separation NN 1d learns the student speech separation NN from the time-series data of the speech feature amount of the mixed speech, the time-series data of the speech feature amount of the individual speech, and the time-series data of the teacher mask created by the teacher speech separation NN 1c.

Figure 15:
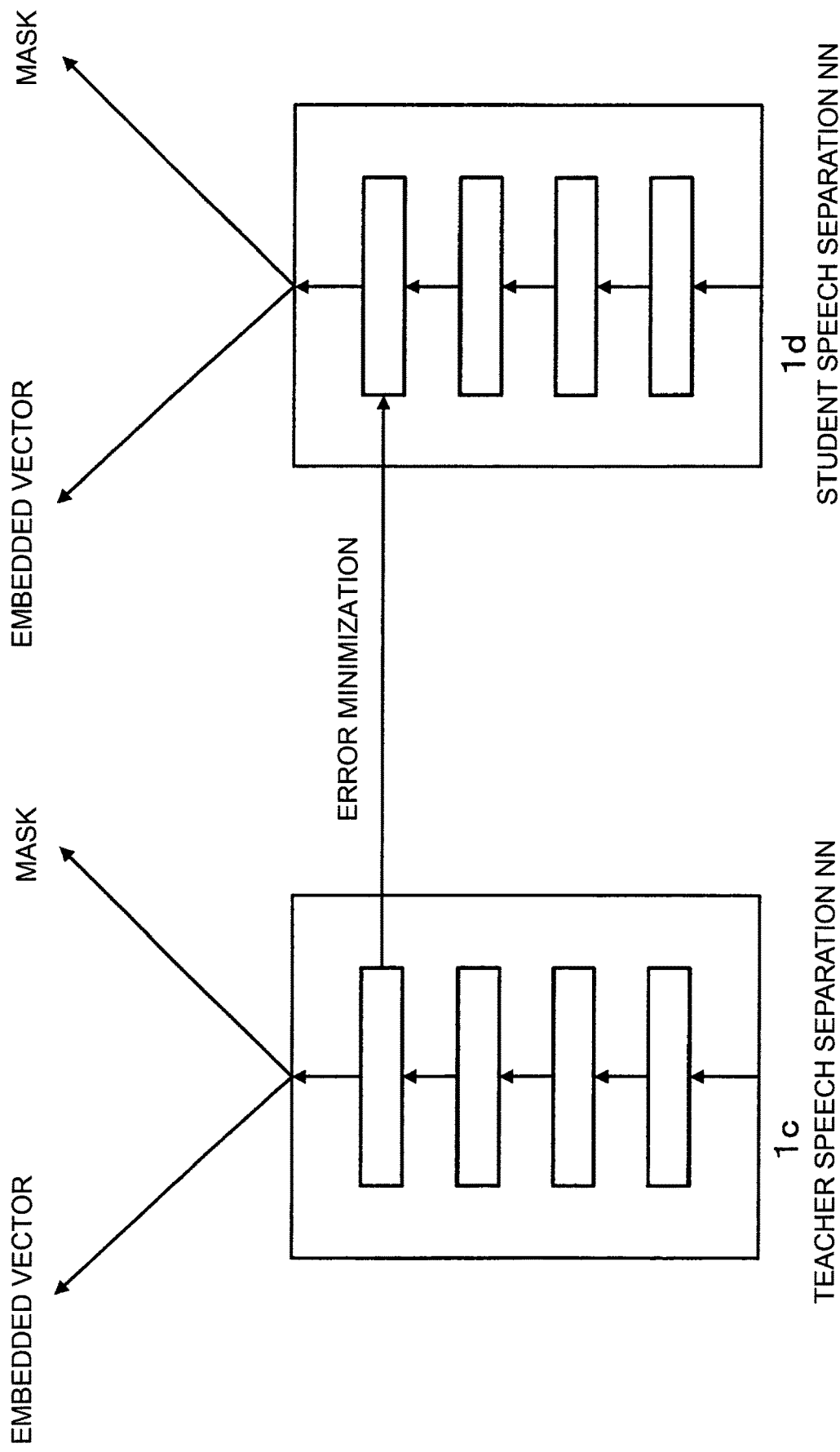
FIG. 15 is a diagram for illustrating a learning mode by a student neural network learning unit of the speech separation model learning device illustrated in FIG. 13.

FIG. 15 is a diagram for illustrating a learning mode by the student NN learning unit 116 of the speech separation system according to the third embodiment. As the teacher data obtained from the teacher speech separation NN 1c, the output of the intermediate layers of the teacher speech separation NN 1c, that is, the output of the intermediate layers obtained from the intermediate layers 1b2 of FIG. 5, is used. The student speech separation NN 1d uses, in addition to the loss function used in the learning of the teacher speech separation NN 1c, the difference between the output of the intermediate layers 1b2 of the teacher speech separation NN 1c and the output of the intermediate layers 1b2 of the student speech separation NN 1d as a loss function, and performs the learning so as to minimize the weighted sum L of the two loss functions shown in the following expression (15).

$$L = L_{chi} + \beta L_{diff} \quad (15)$$

In this expression, $L_{chi}$ is a loss function. The loss function $L_{chi}$ is described in Non-Patent Literature 1, for example. $L_{diff}$ is the distance between the output of the intermediate layers 1b2 of the teacher speech separation NN 1c and the output of the intermediate layers 1b2 of the student speech separation NN 1d. As the distance, for example, the L2 norm or cross entropy between the outputs can be used. Symbol $\beta$ is a weighting coefficient. The weighting coefficient $\beta$ is, for example, an empirically determined value. The layer to be imitated by the student speech separation NN 1d may be any layer of the teacher speech separation NN 1c having a matching number of dimensions as the number of dimensions of the student speech separation NN 1d. When imitating a layer that does not have a matching number of dimensions, the student speech separation NN 1d learns a neural network such that the number of dimensions of the teacher speech separation NN 1c is converted into the number of dimensions of the student speech separation NN 1d.

<3-3> Effects

As described above, in the speech separation model learning device 31 of the speech separation system according to the third embodiment, the model learning unit 115 learns the teacher speech separation NN 1c, and the student NN learning unit 116 learns the student speech separation NN 1d based on the teacher-student learning such that the output of the intermediate layers 1b2 of the teacher speech separation NN 1c is imitated. In the third embodiment, the information in the teacher speech separation NN 1c is imitated in the student speech separation NN 1d, and therefore the speech separation accuracy is improved as compared with the speech separation NN 1b learned in the first embodiment.

The third embodiment is the same as the first embodiment or the second embodiment except for the points described above.

<4> Fourth Embodiment

A speech separation system according to a fourth embodiment of the present invention is configured to change teacher data obtained from the teacher speech separation NN 1c of the speech separation model learning device 31 of the speech separation system according to the third embodiment into an embedded vector obtained from the teacher speech separation NN 1c, and to change the loss function of the student NN learning unit 116 in accordance with the change into the embedded vector. FIG. 13 and FIG. 14 are also referred to in the description of the fourth embodiment.

When an NN having a chimera structure is used for both the teacher speech separation NN 1c and the student speech separation NN 1d, the student speech separation NN 1d can be trained by using the embedded vector output from the teacher speech separation NN 1c as a teacher. In this case, the learning data obtained from the teacher speech separation NN 1c is the embedded vector output from the teacher speech separation NN 1c.

Figure 16:
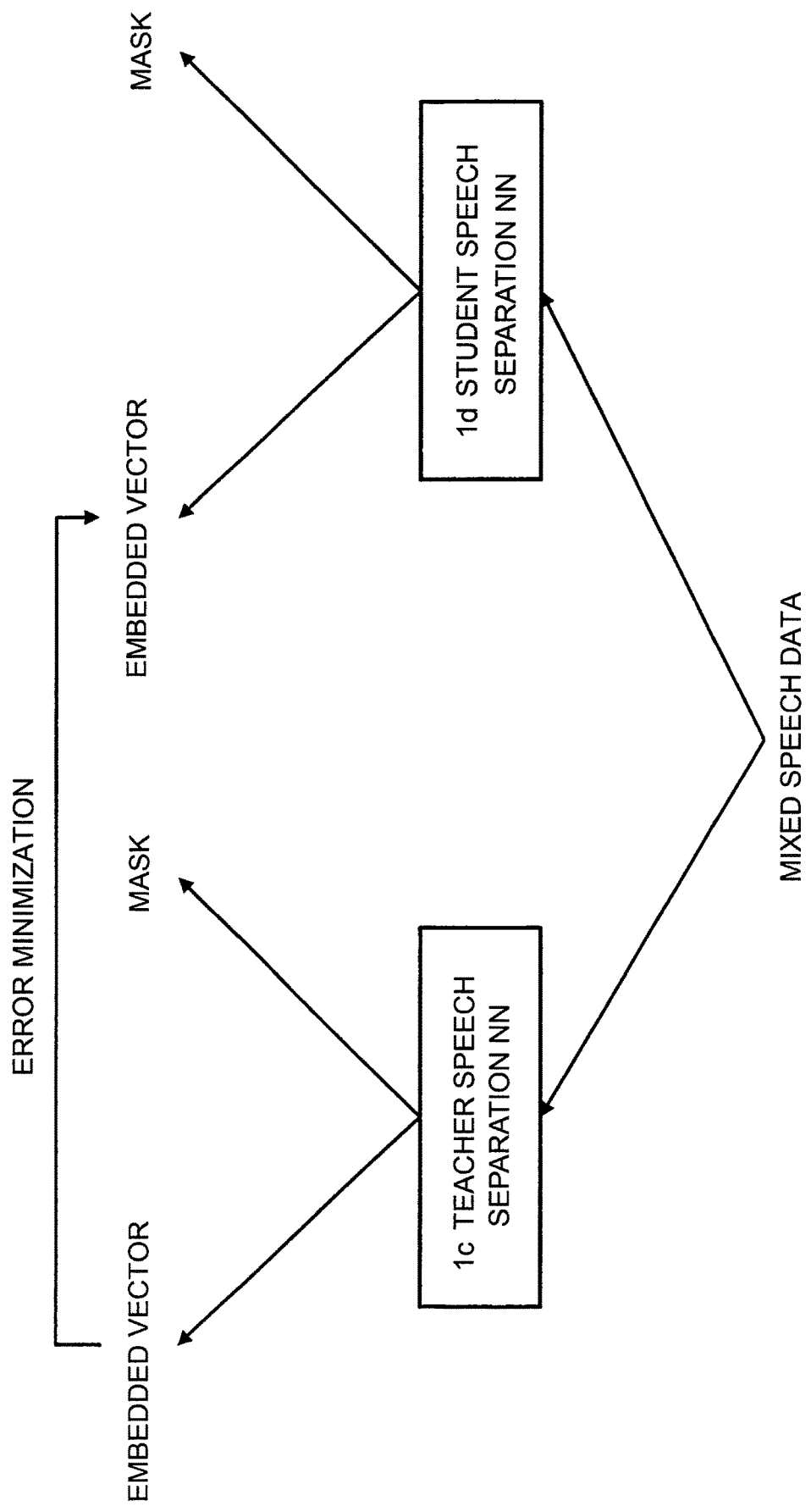
FIG. 16 is a diagram for illustrating a learning mode by a student neural network learning unit of a speech separation model learning device of a speech separation system according to a fourth embodiment of the present invention.

FIG. 16 is a diagram for illustrating a learning mode by the student NN learning unit 116 of the speech separation system according to the fourth embodiment. The student speech separation NN 1d uses, in addition to the loss function used in the learning of the teacher speech separation NN 1c, the difference between the embedded vector output by the teacher speech separation NN 1c and the embedded vector output by the student speech separation NN 1d itself as a loss function, and performs the learning so as to minimize the weighted sum L of the two loss functions shown in the following expression (16).

$$L = L_{chi} + \gamma L_{diffDC} \tag{16}$$

In this expression, $L_{chi}$ is a loss function. $L_{diffDC}$ represents the distance between the embedded vector output by the teacher speech separation NN 1c and the embedded vector output by the student speech separation NN 1d itself. $L_{diffDC}$ is, for example, the L2 norm or cross entropy between the outputs. Symbol $\gamma$ is a weighting coefficient. The weighting coefficient $\gamma$ is, for example, an empirically determined value.

As described above, in the speech separation model learning device 31 of the speech separation system according to the fourth embodiment, the model learning unit 115 learns the teacher speech separation NN 1c, and the student NN learning unit 116 learns the student speech separation NN 1d based on the teacher-student learning such that the embedded vector output from the teacher speech separation NN 1c is imitated. In the speech separation system of the fourth embodiment, the information in the teacher speech separation NN 1c is imitated in the student speech separation NN 1d through the embedded vector, and therefore the speech separation accuracy is improved as compared with the speech separation system of the first embodiment.

Except for the points described above, the fourth embodiment is the same as the third embodiment.

<5> Fifth Embodiment

A speech separation system according to a fifth embodiment of the present invention is configured to change teacher data obtained from the teacher speech separation NN 1c used by the speech separation model learning device 31 of the speech separation system according to the third embodiment into both of an output of the intermediate layers of the teacher speech separation NN 1c and an embedded vector obtained from the teacher speech separation NN 1c, and to change the loss function of the student NN learning unit 116 in accordance with the change into the output and the embedded vector. FIG. 13 to FIG. 16 are also referred to in the description of the fifth embodiment.

When an NN having a chimera structure is used for both the teacher speech separation NN 1c and the student speech separation NN 1d, the student speech separation NN 1d can be trained by combining FIG. 15 and FIG. 16, and using the embedded vector output from the teacher speech separation NN 1c and the output of the intermediate layers 1b2 of the teacher speech separation NN 1c as a teacher.

Figure 17:
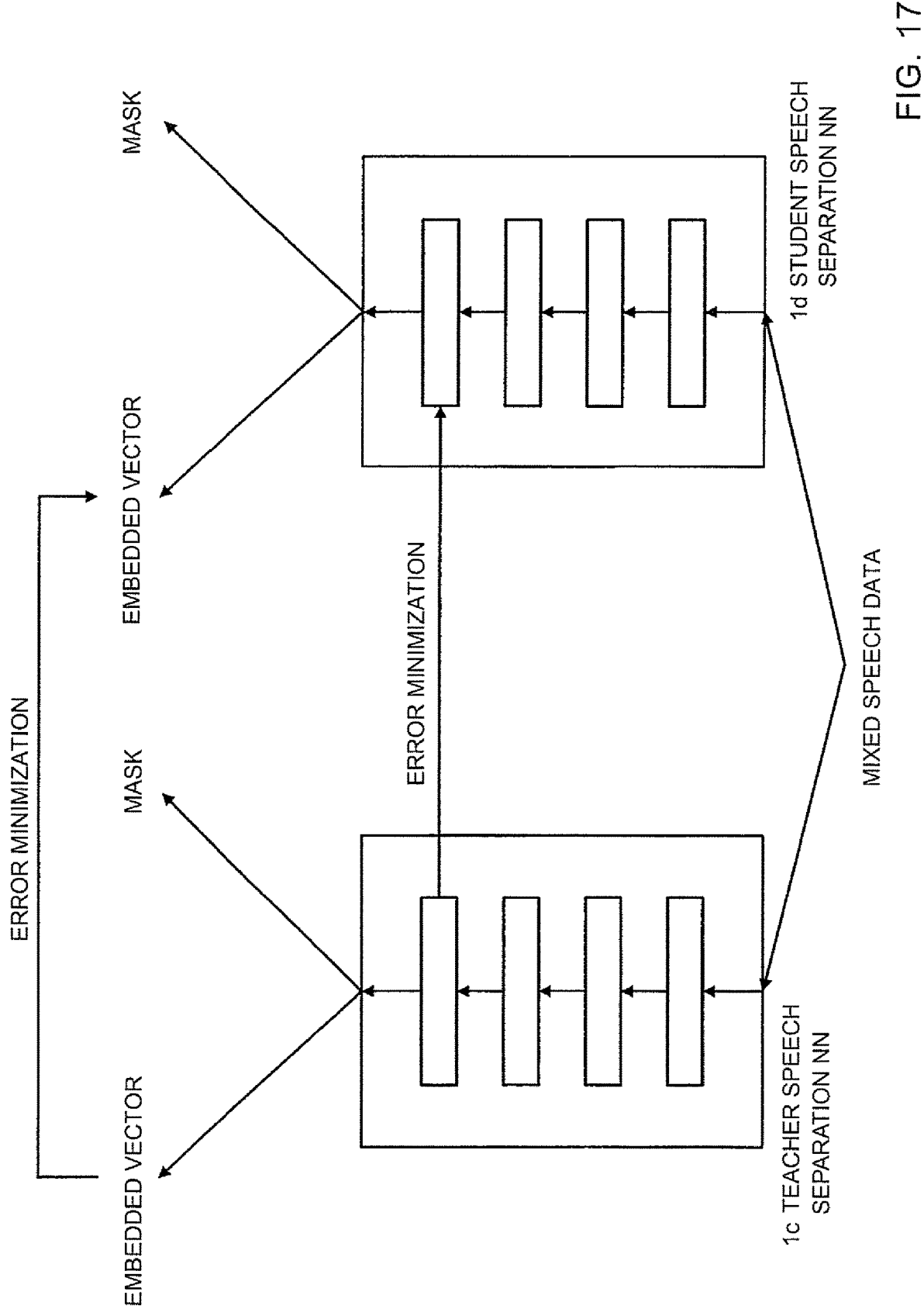
FIG. 17 is a diagram for illustrating a learning mode by a student neural network learning unit of a speech separation model learning device of a speech separation system according to a fifth embodiment of the present invention.

FIG. 17 is a diagram for illustrating a learning mode by the speech separation model learning device of the speech separation system according to the fifth embodiment. The student speech separation NN 1d learns, in addition to the loss function $L_{chi}$ used in the learning of the teacher speech separation NN 1c, the loss function $L_{diff}$ of the distance between the output of the intermediate layers 1b2 of the teacher speech separation NN 1c and the output of the intermediate layers 1b2 of the student speech separation NN 1d, and the loss function $L_{diffDC}$ of the distance between the embedded vector output by the teacher speech separation NN 1c and the embedded vector output by the student speech separation NN 1d itself so as to minimize the weighted sum L of the three loss functions shown in the following expression (17).

$$L = L_{chi} + \beta L_{diff} + \gamma L_{diffDC} \tag{17}$$

In this expression, $L_{chi}$ is a loss function. $L_{diff}$ is the distance between the output of the intermediate layers 1b2 of the teacher speech separation NN 1c and the output of the intermediate layers 1b2 of the student speech separation NN 1d. $L_{diffDC}$ is the distance between the embedded vector output by the teacher speech separation NN 1c and the embedded vector output by the student speech separation NN 1d itself. Symbol $\beta$ is a weighting coefficient of the loss function $L_{diff}$. Symbol $\gamma$ is a weighting coefficient of the loss function $L_{diffDC}$.

As described above, in the speech separation model learning device 31 of the speech separation system according to the fifth embodiment, the model learning unit 115 learns the teacher speech separation NN 1c, and the student NN learning unit 116 learns the student speech separation NN 1d based on the teacher-student learning such that the output of the intermediate layers 1b2 of the teacher speech separation NN 1c and the embedded vector are imitated. In the speech separation system of the fifth embodiment, the information in the teacher speech separation NN is imitated in the student speech separation NN through the output of the intermediate layers and the embedded vector, and therefore the speech separation accuracy is improved as compared with the speech separation system of the first embodiment.

Except for the points described above, the fifth embodiment is the same as the third embodiment or the fourth embodiment.

INDUSTRIAL APPLICABILITY

The speech separation device, the speech separation method, the speech separation program, and the speech separation system according to the first embodiment to the fifth embodiment can separate the mixed speech of a plurality of speakers with a short delay processing time. Therefore, the speech separation device, the speech separation method, the speech separation program, and the speech separation system according to the first embodiment to the fifth embodiment can be used for a device requiring separation of speech, for example, a speech recognition device.

REFERENCE SIGNS LIST 1 speech separation system, 1a learning data, 1b, 2b, 2c, 2d speech separation NN, 1c teacher speech separation NN, 1d student speech separation NN, 11, 31 speech separation model learning device, 12, 22 speech separation device, 12*a* speech separation unit, 111 mixed speech creation unit, 112 feature amount extraction unit (feature amount extraction unit for learning), 113 mask creation unit, 114 block division unit (block division unit for learning), 115 model learning unit, 116 student NN learning unit, 121 feature amount extraction unit, 122 block division unit (block division unit for speech separation), 123 speech restoration unit, 124 block length selection unit

The invention claimed is:

1. A speech separation device configured to separate, from mixed speech data of mixed speech including speech of a plurality of speakers, speech data of speech of each of the plurality of speakers, the speech separation device comprising:
    feature amount extracting circuitry configured to extract time-series data of a speech feature amount of the mixed speech from the mixed speech data;
    a block divider configured to divide the time-series data of the speech feature amount into blocks having a certain time width to generate time-series data of the speech feature amount divided into blocks;
    a speech separation neural network including a combination of a Long Short-Term Memory (LSTM) neural network forward in a time axis direction and an LSTM neural network backward in the time axis direction, the speech separation neural network being configured to create time-series data of a mask of each of the plurality of speakers from the time-series data of the speech feature amount divided into blocks; and
    speech restoration circuitry configured to restore the speech data of the speech of each of the plurality of speakers from the time-series data of the mask and the time-series data of the speech feature amount of the mixed speech,
    the speech separation neural network being configured to use, when creating the time-series data of the mask of each of the plurality of speakers, the time-series data of a block earlier in time than a present time in the forward LSTM neural network, and the time-series data of a block composed of a predetermined number of frames later in time than the present time in the backward LSTM neural network.

2. The speech separation device according to claim 1, further comprising a block length selector configured to select, when the time-series data of the speech feature amount is divided into one or more blocks in the time axis direction, a block length specifying the time width of the blocks in accordance with the speech feature amount,
    wherein the speech separation neural network includes a plurality of speech separation neural networks, and
    wherein the time-series data of the mask of each of the plurality of speakers is created by using, of the plurality of speech separation neural networks, a speech separation neural network corresponding to the block length.

3. A speech separation system, comprising:
    the speech separation device of claim 1; and
    a speech separation model learning device configured to learn the speech separation neural network,
    the speech separation model learning device including:
        mixed speech creating circuitry configured to create, from learning data including speech data of individual speech uttered by each of a plurality of speakers, speech data of mixed speech including speech of the plurality of speakers;
        feature amount extracting circuitry for learning configured to extract time-series data of a speech feature amount of the mixed speech from the speech data of the mixed speech and to extract time-series data of a speech feature amount of the individual speech from the speech data of the individual speech;
        mask creating circuitry configured to create time-series data of a mask of each of the plurality of speakers from the time-series data of the speech feature amount of the mixed speech and the time-series data of the speech feature amount of the individual speech which are extracted by the feature amount extracting circuitry for learning; and
        model learning circuitry configured to learn the speech separation neural network from the time-series data of the speech feature amount of the mixed speech and the time-series data of the speech feature amount of the individual speech which are extracted by the feature amount extracting circuitry for learning and from the time-series data of the mask created by the mask creating circuitry.

4. A speech separation system, comprising:
    the speech separation device of claim 2; and
    a speech separation model learning device configured to learn the speech separation neural network,
    the speech separation model learning device including:
        mixed speech creating circuitry configured to create, from learning data including speech data of individual speech uttered by each of a plurality of speakers, speech data of mixed speech including speech of the plurality of speakers;
        feature amount extracting circuitry for learning configured to extract time-series data of a speech feature amount of the mixed speech from the speech data of the mixed speech and to extract time-series data of a speech feature amount of the individual speech from the speech data of the individual speech;
        mask creating circuitry configured to create time-series data of a mask of each of the plurality of speakers from the time-series data of the speech feature amount of the mixed speech and the time-series data of the speech feature amount of the individual speech which are extracted by the feature amount extracting circuitry for learning; and
        model learning circuitry configured to learn the speech separation neural network from the time-series data of the speech feature amount of the mixed speech and the time-series data of the speech feature amount of the individual speech which are extracted by the feature amount extracting circuitry for learning and from the time-series data of the mask created by the mask creating circuitry.

5. The speech separation system according to claim 3,
    wherein the speech separation model learning device further includes a block divider for learning configured to divide the time-series data of the speech feature amount of the mixed speech and the time-series data of the speech feature amount of the individual speech which are created by the mixed speech creating circuitry, and the time-series data of the mask created by the mask creating circuitry into one or more blocks in the time axis direction, and
    wherein the model learning circuitry is configured to learn the speech separation neural network from the time-series data of the speech feature amount of the mixed speech divided into blocks by the block divider for learning, the time-series data of the speech feature amount of the individual speech divided into blocks by the block divider for learning, and the time-series data of the mask divided into blocks by the block divider for learning.

6. The speech separation system according to claim 4, wherein the speech separation model learning device further includes a block divider for learning configured to divide the time-series data of the speech feature amount of the mixed speech and the time-series data of the speech feature amount of the individual speech which are created by the mixed speech creating circuitry, and the time-series data of the mask created by the mask creating circuitry into one or more blocks in the time axis direction, and wherein the model learning circuitry is configured to learn the speech separation neural network from the time-series data of the speech feature amount of the mixed speech divided into blocks by the block divider for learning, the time-series data of the speech feature amount of the individual speech divided into blocks by the block divider for learning, and the time-series data of the mask divided into blocks by the block divider for learning.

7. A speech separation system, comprising:
the speech separation device of claim 1; and
a speech separation model learning device configured to learn the speech separation neural network,
the speech separation model learning device including:
  mixed speech creating circuitry configured to create, from learning data including speech data of individual speech uttered by each of a plurality of speakers, speech data of mixed speech including speech of the plurality of speakers;
  feature amount extracting circuitry for learning configured to extract time-series data of a speech feature amount of the mixed speech from the speech data of the mixed speech and to extract time-series data of a speech feature amount of the individual speech from the speech data of the individual speech;
  mask creating circuitry configured to create time-series data of a mask of each of the plurality of speakers from the time-series data of the speech feature amount of the mixed speech and the time-series data of the speech feature amount of the individual speech which are extracted by the feature amount extracting circuitry for learning;
  model learning circuitry configured to learn a teacher speech separation neural network from the time-series data of the speech feature amount of the mixed speech and the time-series data of the speech feature amount of the individual speech which are extracted by the feature amount extracting circuitry for learning and from the time-series data of the mask created by the mask creating circuitry; and
  student neural network learning circuitry configured to learn the speech separation neural network, which is a student speech separation neural network,
  the student speech separation neural network being learned from the time-series data of the speech feature amount of the mixed speech, the time-series data of the speech feature amount of the individual speech, and the time-series data of the mask created by the teacher speech separation neural network.

8. A speech separation system, comprising:
the speech separation device of claim 2; and
a speech separation model learning device configured to learn the speech separation neural network,
the speech separation model learning device including:
  mixed speech creating circuitry configured to create, from learning data including speech data of individual speech uttered by each of a plurality of speakers, speech data of mixed speech including speech of the plurality of speakers;
  feature amount extracting circuitry for learning configured to extract time-series data of a speech feature amount of the mixed speech from the speech data of the mixed speech and to extract time-series data of a speech feature amount of the individual speech from the speech data of the individual speech;
  mask creating circuitry configured to create time-series data of a mask of each of the plurality of speakers from the time-series data of the speech feature amount of the mixed speech and the time-series data of the speech feature amount of the individual speech which are extracted by the feature amount extracting circuitry for learning;
  model learning circuitry configured to learn a teacher speech separation neural network from the time-series data of the speech feature amount of the mixed speech and the time-series data of the speech feature amount of the individual speech which are extracted by the feature amount extracting circuitry for learning and from the time-series data of the mask created by the mask creating circuitry; and
  student neural network learning circuitry configured to learn the speech separation neural network, which is a student speech separation neural network,
  the student speech separation neural network being learned from the time-series data of the speech feature amount of the mixed speech, the time-series data of the speech feature amount of the individual speech, and the time-series data of the mask created by the teacher speech separation neural network.

9. The speech separation system according to claim 7, wherein the speech separation model learning device further includes a block divider for learning configured to divide the time-series data of the speech feature amount of the mixed speech and the time-series data of the speech feature amount of the individual speech which are created by the mixed speech creating circuitry, and the time-series data of the mask created by the mask creating circuitry into one or more blocks in the time axis direction, and wherein the student neural network learning circuitry is configured to learn the student speech separation neural network from the time-series data of the speech feature amount of the mixed speech divided into blocks by the block divider for learning, the time-series data of the speech feature amount of the individual speech divided into blocks by the block divider for learning, and the time-series data of the mask divided into blocks by the block divider for learning.

10. The speech separation system according to claim 8, wherein the speech separation model learning device further includes a block divider for learning configured to divide the time-series data of the speech feature amount of the mixed speech and the time-series data of the speech feature amount of the individual speech which are created by the mixed speech creating circuitry, and the time-series data of the mask created by the mask creating circuitry into one or more blocks in the time axis direction, and wherein the student neural network learning circuitry is configured to learn the student speech separation neural network from the time-series data of the speech feature amount of the mixed speech divided into blocks by the block divider for learning, the time-series data of the speech feature amount of the individual speech divided into blocks by the block divider for learning, and the time-series data of the mask divided into blocks by the block divider for learning.

11. The speech separation system according to claim 3, wherein the speech separation neural network includes:
   an input layer to which the speech feature amount of the mixed speech is to be input;
   an intermediate layer configured to create at least one of the mask or an embedded vector of the speech feature amount of the mixed speech;
   a mask output layer configured to output the mask created by the intermediate layer; and
   an embedded vector output layer configured to output the embedded vector.

12. The speech separation system according to claim 4, wherein the speech separation neural network includes:
   an input layer to which the speech feature amount of the mixed speech is to be input;
   an intermediate layer configured to create at least one of the mask or an embedded vector of the speech feature amount of the mixed speech;
   a mask output layer configured to output the mask created by the intermediate layer; and
   an embedded vector output layer configured to output the embedded vector.

13. The speech separation system according to claim 5, wherein the speech separation neural network includes:
   an input layer to which the speech feature amount of the mixed speech is to be input;
   an intermediate layer configured to create at least one of the mask or an embedded vector of the speech feature amount of the mixed speech;
   a mask output layer configured to output the mask created by the intermediate layer; and
   an embedded vector output layer configured to output the embedded vector.

14. The speech separation system according to claim 6, wherein the speech separation neural network includes:
   an input layer to which the speech feature amount of the mixed speech is to be input;
   an intermediate layer configured to create at least one of the mask or an embedded vector of the speech feature amount of the mixed speech;
   a mask output layer configured to output the mask created by the intermediate layer; and
   an embedded vector output layer configured to output the embedded vector.

15. The speech separation system according to claim 7, wherein the speech separation neural network includes:
   an input layer to which the speech feature amount of the mixed speech is to be input;
   an intermediate layer configured to create at least one of the mask or an embedded vector of the speech feature amount of the mixed speech;
   a mask output layer configured to output the mask created by the intermediate layer; and
   an embedded vector output layer configured to output the embedded vector.

16. The speech separation system according to claim 8, wherein the speech separation neural network includes:
   an input layer to which the speech feature amount of the mixed speech is to be input;
   an intermediate layer configured to create at least one of the mask or an embedded vector of the speech feature amount of the mixed speech;
   a mask output layer configured to output the mask created by the intermediate layer; and
   an embedded vector output layer configured to output the embedded vector.

17. The speech separation system according to claim 9, wherein the speech separation neural network includes:
   an input layer to which the speech feature amount of the mixed speech is to be input;
   an intermediate layer configured to create at least one of the mask or an embedded vector of the speech feature amount of the mixed speech;
   a mask output layer configured to output the mask created by the intermediate layer; and
   an embedded vector output layer configured to output the embedded vector.

18. The speech separation system according to claim 10, wherein the speech separation neural network includes:
   an input layer to which the speech feature amount of the mixed speech is to be input;
   an intermediate layer configured to create at least one of the mask or an embedded vector of the speech feature amount of the mixed speech;
   a mask output layer configured to output the mask created by the intermediate layer; and
   an embedded vector output layer configured to output the embedded vector.

19. A speech separation method for separating, from mixed speech data of mixed speech including speech of a plurality of speakers, speech data of speech of each of the plurality of speakers, the speech separation method comprising:
   extracting time-series data of a speech feature amount of the mixed speech from the mixed speech data;
   dividing the time-series data of the speech feature amount into blocks having a certain time width to generate time-series data of the speech feature amount divided into blocks;
   creating, by a speech separation neural network including a combination of a Long Short-Term Memory (LSTM) neural network forward in a time axis direction and an LSTM neural network backward in the time axis direction, time-series data of a mask of each of the plurality of speakers from the time-series data of the speech feature amount divided into blocks; and
   restoring the speech data of the speech of each of the plurality of speakers from the time-series data of the mask and the time-series data of the speech feature amount of the mixed speech,
   the speech separation neural network being configured to use, when creating the time-series data of the mask of each of the plurality of speakers, the time-series data of a block earlier in time than a present time in the forward LSTM neural network, and the time-series data of a block composed of a predetermined number of frames later in time than the present time in the backward LSTM neural network.

20. A speech separation program for causing a computer to execute processing of separating, from mixed speech data of mixed speech including speech of a plurality of speakers, speech data of speech of each of the plurality of speakers, the speech separation program causing the computer to execute:
   feature amount extraction processing of extracting time-series data of a speech feature amount of the mixed speech from the mixed speech data;

block division processing of dividing the time-series data of the speech feature amount into blocks having a certain time width to generate time-series data of the speech feature amount divided into blocks;

mask creation processing of creating, by a speech separation neural network including a combination of a Long Short-Term Memory (LSTM) neural network forward in a time axis direction and an LSTM neural network backward in the time axis direction, time-series data of a mask of each of the plurality of speakers from the time-series data of the speech feature amount divided into blocks, the speech separation neural network being configured to use, when creating the time-series data of the mask of each of the plurality of speakers, the time-series data of a block earlier in time than a present time in the forward LSTM neural network, and the time-series data of a block composed of a predetermined number of frames later in time than the present time in the backward LSTM neural network; and speech restoration processing of restoring the speech data of the speech of each of the plurality of speakers from the time-series data of the mask and the time-series data of the speech feature amount of the mixed speech.

* * * * *